(12) United States Patent
Mukaida et al.

(10) Patent No.: US 7,617,352 B2
(45) Date of Patent: Nov. 10, 2009

(54) MEMORY CONTROLLER, FLASH MEMORY SYSTEM HAVING MEMORY CONTROLLER AND METHOD FOR CONTROLLING FLASH MEMORY DEVICE

(75) Inventors: Naoki Mukaida, Tokyo (JP); Kenzo Kita, Tokyo (JP); Yukio Terasaki, Tokyo (JP)

(73) Assignee: TDK Corporation, Tokyo (JP)

( * ) Notice: Subject to any disclaimer, the term of this patent is extended or adjusted under 35 U.S.C. 154(b) by 0 days.

(21) Appl. No.: 10/032,949

(22) Filed: Dec. 26, 2001

(65) Prior Publication Data
US 2002/0172081 A1 Nov. 21, 2002

(30) Foreign Application Priority Data
Dec. 27, 2000 (JP) .............................. 2000-397915

(51) Int. Cl.
*G06F 12/00* (2006.01)
(52) U.S. Cl. .................. 711/103; 711/104; 711/156; 711/158; 711/202; 714/6
(58) Field of Classification Search ........................ None
See application file for complete search history.

(56) References Cited

U.S. PATENT DOCUMENTS

| | | | |
|---|---|---|---|
| 5,457,658 A | | 10/1995 | Niijima et al. |
| 5,579,502 A | * | 11/1996 | Konishi et al. ............... 711/103 |
| 5,835,935 A | | 11/1998 | Estakhri et al. |
| 5,987,573 A | * | 11/1999 | Hiraka ........................ 711/156 |

* cited by examiner

*Primary Examiner*—Tuan V Thai
*Assistant Examiner*—Midys Rojas
(74) *Attorney, Agent, or Firm*—Howard & Howard Attorneys PLLC

(57) ABSTRACT

A memory controller includes decision means responsive to a request to write user data issued by a host computer for determining whether progressive data writing for writing user data to a target page designated by a host address is possible, and write means responsive to an affirmative determination by the decision means for writing user data to the target page without performing an inter-block data transfer. Thus, a series of data write operations for completing data writing can be performed at high speed because the frequency of inter-block data transfers is low.

3 Claims, 10 Drawing Sheets

FIG.8

PHYSICAL BLOCK #4

| | 25 | 26 | | |
|---|---|---|---|---|
| PAGE #0 | | 500 | 10 | 3 |
| PAGE #1 | ▨ | 500 | 10 | 3 |
| PAGE #2 | ▨ | 500 | 10 | 3 |
| PAGE #3 | | 500 | 11 | 31 |
| PAGE #4 | | 8191 | 11 | 31 |
| PAGE #5 | | 8191 | 11 | 31 |
| PAGE #6 | | 8191 | 11 | 31 |
| ... | | ... | ... | ... |
| PAGE #30 | | 8191 | 11 | 31 |
| PAGE #31 | | 500 | 11 | 31 |
| | | 29 | 32 | 33 |

FIG.9

PHYSICAL BLOCK #4

|  | 25 | 26 | | |
| --- | --- | --- | --- | --- |
| PAGE #0 |  | 500 | 10 | 3 |
| PAGE #1 | ▨ | 500 | 10 | 3 |
| PAGE #2 | ▨ | 500 | 10 | 3 |
| PAGE #3 | ▨ | 500 | 10 | 5 |
| PAGE #4 | ▨ | 8191 | 10 | 5 |
| PAGE #5 |  | 8191 | 11 | 31 |
| PAGE #6 |  | 8191 | 11 | 31 |
| · | · | · | · | · |
| · | · | · | · | · |
| · | · | · | · | · |
| · | · | · | · | · |
| · | · | · | · | · |
| PAGE #30 |  | 8191 | 11 | 31 |
| PAGE #31 |  | 500 | 11 | 31 |
|  |  | 29 | 32 | 33 |

FIG.10

PHYSICAL BLOCK #4

|  | 25 | 26 | | |
|---|---|---|---|---|
| PAGE #0 |  | 500 | 10 | 3 |
| PAGE #1 | ▨ | 500 | 10 | 3 |
| PAGE #2 | ▨ | 500 | 10 | 3 |
| PAGE #3 |  | 500 | 10 | 6 |
| PAGE #4 |  | 8191 | 11 | 31 |
| PAGE #5 | ▨ | 8191 | 10 | 6 |
| PAGE #6 |  | 8191 | 11 | 31 |
| · | · | · | · | · |
| · | · | · | · | · |
| · | · | · | · | · |
| · | · | · | · | · |
| · | · | · | · | · |
| PAGE #30 |  | 8191 | 11 | 31 |
| PAGE #31 |  | 500 | 11 | 31 |
|  |  | 29 | 32 | 33 |

FIG.11

PHYSICAL BLOCK #4

| | 25 | 26 | | |
|---|---|---|---|---|
| PAGE # 0 | | 5 0 0 | 0 0 | 3 |
| PAGE # 1 | ▨ | 5 0 0 | 1 0 | 3 |
| PAGE # 2 | ▨ | 5 0 0 | 1 0 | 3 |
| PAGE # 3 | | 5 0 0 | 1 1 | 3 1 |
| PAGE # 4 | | 8 1 9 1 | 1 1 | 3 1 |
| PAGE # 5 | | 8 1 9 1 | 1 1 | 3 1 |
| PAGE # 6 | | 8 1 9 1 | 1 1 | 3 1 |
| · | · | · | · | · |
| · | · | · | · | · |
| · | · | · | · | · |
| · | · | · | · | · |
| PAGE # 3 0 | | 8 1 9 1 | 1 1 | 3 1 |
| PAGE # 3 1 | ▨ | 5 0 0 | 1 1 | 3 1 |
| | | 29 | 32 | 33 |

MEMORY CONTROLLER, FLASH MEMORY SYSTEM HAVING MEMORY CONTROLLER AND METHOD FOR CONTROLLING FLASH MEMORY DEVICE

BACKGROUND OF THE INVENTION

The present invention relates to a memory controller, a flash memory system and a method for controlling a flash memory device, and particularly, to such a memory controller and a flash memory system that can perform a series of data write operations to a flash memory device at high speed and a method for performing a series of data write operations to a flash memory device at high speed.

DESCRIPTION OF THE PRIOR ART

In recent years, flash memory devices, particularly NAND type flash memory devices, have come into wide use as semiconductor memory devices for memory cards, silicon disks and the like. In such a NAND type flash memory device, although a transition from an erased state (logical value="1") to a programmed state (logical value="0") can be performed for each memory cell as an individual unit, a transition from the programmed state (0) to the erased state (1) cannot be performed for each memory cell as an individual unit. Such a transition from the programmed state to the erased state can be only performed for a predetermined number of memory cells as a unit, called a "block", constituted of a plurality of memory cells. Such an operation is called "block erasing".

According to the flash memory device, because the transition from the programmed state to the erased state cannot be performed for each memory cell as an individual unit, in order to write new data into a block in which some data are already stored, the block erasing is required for all memory cells constituting the block before new data is stored. Therefore, in case of writing new data into a block in which some data are already stored, the data already stored in the block must be transferred to another erased block in order to prevent the data already stored from being lost.

Thus, when an operation for writing new data into a block in which some data are already stored is requested by a host computer, the new data and the already stored data are stored into an erased block. Such an operation is called "inter-block data transfer". After the inter-block data transfer, block erasing is preformed to erase all memory cells constituting the source block. By this, the source block becomes a new erased block.

As described above, in the conventional flash memory system, an inter-block data transfer is required each time an operation for writing new data into a block in which some data are already stored is requested by the host computer.

However, there is a problem that a series of inter-block transfers requires much time.

Specifically, in an inter-block data transfer, a controller must read data from the source block and write them to the destination block for each page. Therefore, an amount of time substantially proportional to the number of pages in which the data are stored is required to complete the data transfer from all pages of the source block to the destination block.

For this reason, if some data are already stored in the block, much time is required to complete the series of operations even if the data write request issued by the host computer is to store data of only one page.

A need has therefore been felt for a memory controller, a flash memory system and a method for controlling a flash memory device that can perform a series of data write operations at high speed when a data write request is issued by the host computer.

It is therefore an object of the present invention to provide a memory controller that can perform a series of data write operations so as to complete data writing at high speed in response to a data write request issued by a host computer even if some data are already stored in the block in which the new data are to be stored and a flash memory system employing such a memory controller.

Another object of the present invention is to provide a method for controlling a flash memory device that can perform a series of data write operations so as to complete data writing at high speed in response to a data write request issued by a host computer even if some data are already stored in the block in which the new data are to be stored.

SUMMARY OF THE INVENTION

The present invention was accomplished based on the observation that, in the case where a data write request is issued by the host computer, if all flash memory cells constituting the page in which the data are to be stored are in the erased state, progressive data writing of the data is possible without performing an inter-block data transfer even if some data are already stored in the block.

The above and other objects of the present invention can be accomplished by a memory controller for accessing a memory having a plurality of blocks each constituted of a plurality of pages based on a host address supplied from a host computer, comprising:

decision means responsive to a request to write user data issued by the host computer for determining whether progressive data writing for writing user data to a target page designated by the host address is possible; and write means responsive to an affirmative determination by the decision means for writing user data to the target page without performing an inter-block data transfer.

According to this aspect of the present invention, because the writing of user data is performed in response to a determination that progressive data writing is possible, without performing an inter-block data transfer, the frequency of inter-block data transfers can be reduced. Therefore, a series of data write operations for completing data writing can be performed at high speed.

In a preferred aspect of the present invention, the decision means makes the determination by referring to a table in which free page information concerning at least a part of the plurality of blocks is stored.

In a further preferred aspect of the present invention, the write means writes at least a part of new free page information resulting from writing user data to at least one page included in the block which includes the target page.

According to this preferred aspect of the present invention, because at least a part of the new free page information is written into a block included in the memory, the table can be easily generated by referring to the free page information even after the memory controller is reset.

In a further preferred aspect of the present invention, the free page information includes at least first information indicating whether any free pages exist and second information designating the free pages.

In a further preferred aspect of the present invention, the memory controller further comprises table generating means for generating the table based on the first information read from a top page of at least a part of the plurality of blocks.

According to this preferred aspect of the present invention, because the information stored in the top page of at least a part of the plurality of blocks is used for generating the table, the time required to complete the initialization of the memory controller is not increased by applying the present invention.

In a further preferred aspect of the present invention, the free page information contained in the table is composed of items of start page information indicating those pages among the pages contained in corresponding blocks that are top pages of sets of one or more pages, which top pages and all following pages are free pages.

According to this preferred aspect of the present invention, because each item of free page information is composed of start page information, the volume of the data thereof can be reduced.

The above and other objects of the present invention can be also accomplished by a memory controller for accessing a memory having a plurality of blocks each constituted of a plurality of pages based on a host address supplied from a host computer, comprising:

write means responsive to a request to write user data to a free block issued by the host computer for writing user data to a user area of a page included in the free block that is a first page designated by the host address; and means for writing free page information to a redundant area of a top page included in the free block.

According to this aspect of the present invention, because the free page information is written into the redundant area of the top page during writing of user data, the free pages of the block after data writing is performed can be known by referencing the free page information.

In a preferred aspect of the present invention, the free page information includes at least a free page flag indicating whether any free pages exist and free page data designating the free pages.

In a further preferred aspect of the present invention, the free page data designate a second page following the first page.

According to this preferred aspect of the present invention, because it is ensured that the second page and following pages are free pages, progressive data writing can be performed without performing an interblock data transfer when a data write request to write new user data to the second page or a following page is issued.

In a further preferred aspect of the present invention, the memory controller further comprises:

decision means responsive to a request to write user data to the block issued by the host computer for determining based on the free page information whether progressive data writing for writing user data to a third page designated by the host address is possible;

write means responsive to an affirmative determination by the decision means for writing user data to the user area of the third page included in the block; and write means for writing free page data designating a fourth page following the third page to the redundant area of the second page included in the block.

According to this preferred aspect of the present invention, because it is ensured that the fourth page and following pages are free pages, progressive data writing can be performed without performing an inter-block data transfer when data a write request to write new user data to the fourth page or following pages is issued.

In a further preferred aspect of the present invention, the memory controller further, comprises:

decision means responsive to a request to write user data to a last page of the block issued by the host computer for determining based on the free page information whether progressive data writing for writing user data to the last page is possible;

write means responsive to an affirmative determination by the decision means for writing user data to the user area of the last page; and means for changing the free page flag stored in the redundant area of the top page.

According to this preferred aspect of the present invention, because the free page flag stored in the redundant area of the top page is changed when user data are written into the last page, further data writing for writing new user data to this block can be inhibited by referencing the free page flag.

The above and other objects of the present invention can be also accomplished by a flash memory system comprising a flash memory having a plurality of blocks each constituted of a plurality of pages and a memory controller for accessing the flash memory based on a host address supplied from a host computer, the memory controller, comprising:

decision means responsive to a request to write user data issued by the host computer for determining whether progressive data writing for writing user data to a target page designated by the host address is possible; and write means responsive to an affirmative determination by the decision means for writing user data to the target page without performing an inter-block data transfer.

According to this aspect of the present invention, because the writing of user data is performed in response to a determination that progressive data writing is possible, without performing an inter-block data transfer, the frequency of the inter-block data transfers can be reduced. Therefore, a series of data write operations for completing data writing can be performed at high speed.

In a preferred aspect of the present invention, each block has a user area and a redundant area in which free page information for the corresponding block is stored.

In a further preferred aspect of the present invention, the memory controller further comprises a table in which the free page information concerning at least a part of the plurality of blocks is stored and the decision means makes the determination by referring to the table.

The above and other objects of the present invention can be also accomplished by a method for controlling a flash memory, comprising:

a determining step conducted in response to a request to write user data issued by a host computer of determining whether progressive data writing for writing user data to a target page designated by the host address is possible; and a writing step conducted in response to an affirmative determination in the determining step of writing user data to the target page without performing an inter-block data transfer.

BRIEF DESCRIPTION OF THE DRAWINGS

FIG. 8 is a schematic diagram showing user data stored in pages #1 and #2 of a physical block #4.

FIG. 9 is a schematic diagram showing user data stored in pages #1 to #4 of the physical block #4.

FIG. 10 is a schematic diagram showing user data stored in pages #1, #2 and #5 of the physical block #4.

FIG. 11 is a schematic diagram showing user data stored in pages #1, #2 and #31 of the physical block #4.

DESCRIPTION OF THE PREFERRED EMBODIMENT

A preferred embodiment of the present invention will be explained in detail with reference to the drawings.

Figure 1:
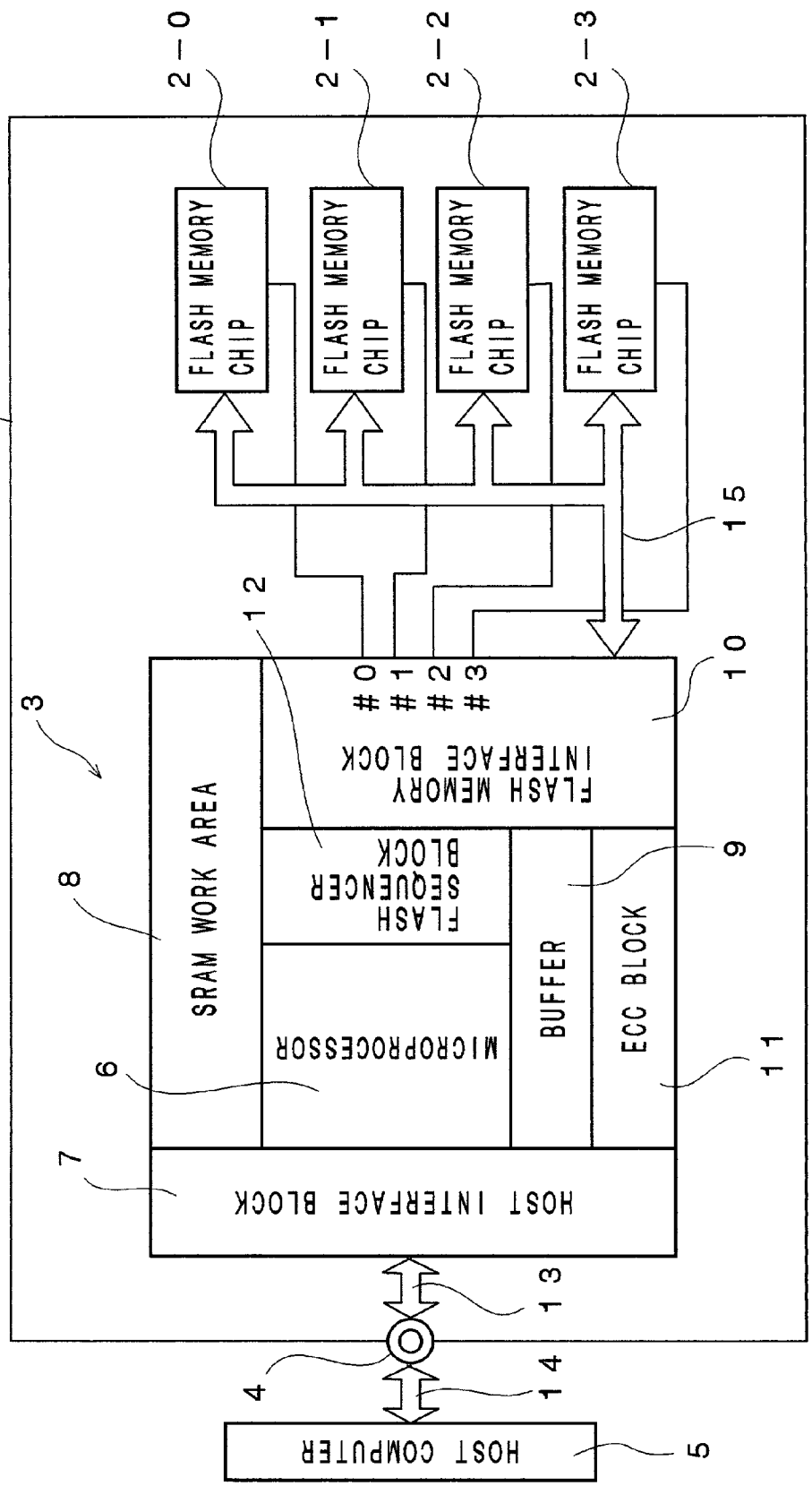
FIG. 1 is a schematic block diagram showing a flash memory system 1 that is a preferred embodiment of the present invention.

FIG. 1 is a schematic block diagram showing a flash memory system 1 that is a preferred embodiment of the present invention.

As shown in FIG. 1, the flash memory system 1 has the shape of a card, and is composed of four flash memory chips 2-0 to 2-3, a controller 3, and a connector 4, each of which is integrated into the card. The flash memory system 1 can be removably attached to a host computer 5 for use as a kind of an external storage device for the host computer 5. The host computer 5 can be any of various types and, for example, can be a personal computer for processing various information such as text data, sound data, and visual data or can be the computer of a digital still camera.

Each flash memory chip 2-0 to 2-3 is a semiconductor chip having a capacity of 128 M bytes (1 G bits), for example. In the flash memory system 1, each page, which is a minimum access unit, is composed of 512 bytes for storing user data. Thus, the address space of each flash memory chip 2-0 to 2-3 includes 256K pages, and the amount of address space of the flash memory chips 2-0 to 2-3 is 1 M pages. In the flash memory system 1, these four flash memory chips 2-0 to 2-3 are treated as a big single memory having a capacity of 512M bytes (4 G bits) and 1M pages of address space. Address information of 20-bit length is required to access such a memory having 1 M pages of address space. Thus, to access an individual page, the host computer 5 supplies address information of 20-bit length to the flash memory system 1. Such address information of 20-bit length supplied from the host computer 5 to the flash memory system 1 is referred to as a "host address".

The controller 3 is composed of a microprocessor 6, a host interface block 7, a SRAM (static random access memory) work area 8, a buffer 9, a flash memory interface block 10, an ECC (error correction code) block 11, and a flash sequencer block 12. These functional blocks composing the controller 3 are integrated in a single semiconductor chip.

The microprocessor 6 is a functional block which controls the operations of each functional block composing the controller 3.

The host interface block 7 is connected to the connector 4 via a bus 13 to send or receive data, address information, status information, and external command information to/from the host computer 5 under the control of the microprocessor 6. Specifically, when the flash memory system 1 is attached to the host computer 5, the flash memory system 1 and the host computer 5 are electrically connected to each other via the bus 13, the connector 4, and a bus 14. When the electrical connection between the flash memory system 1 and the host computer 5 is established, various information such as data supplied from the host computer 5 to the flash memory system 1 is input to the controller 3 via the host interface block 7 serving as an input section, and various information such as data supplied from the flash memory system 1 to the host computer 5 is output from the controller 3 via the host interface block 7 serving as an output section. Further, the host interface block 7 employs task file registers (not shown) temporarily storing the host address and the external commands from the host computer 5 and error registers (not shown) which are set in response to error occurrence.

The SRAM work area 8, composed of a plurality of SRAM cells, is a working area for temporarily storing data used by the microprocessor 6 for controlling the flash memory chips 2-0 to 2-3.

The buffer 9 is for temporarily storing data read from the flash memory chips 2-0 to 2-3 and data to be written into the flash memory chips 2-0 to 2-3. Specifically, data read from the flash memory chips 2-0 to 2-3 are temporarily stored in the buffer 9 until the host computer 5 is ready to receive them, and data to be written into the flash memory chips 2-0 to 2-3 are temporarily stored in the buffer 9 until the flash memory chips 2-0 to 2-3 are ready to be written.

The flash memory interface block 10 is a functional block for sending or receiving data, address information, status information, and internal command information to/from the flash memory chips 2-0 to 2-3 via a bus 15 and for supplying the chip selection signals #0 to #3 to the flash memory chips 2-0 to 2-3. One of chip selection signals #0 to #3 is activated based on the upper two bits of the host address supplied from the host computer 5 when a data read operation or a data write operation is requested by the host computer 5. Specifically, the chip selection signal #0 is selectively activated based on the upper two bits of the host address being "00", the chip selection signal #1 is selectively activated based on the upper two bits of the host address being "01", the chip selection signal #2 is selectively activated based on the upper two bits of the host address being "10", and the chip selection signal #3 is selectively activated based on the upper two bits of the host address being "11". Each of the chip selection signals #0 to #3 activates a corresponding flash memory chip 2-0 to 2-3 to allow the data read operation and the data write operation to be performed. It is noted that the "internal command information" is distinguished from the "external command information": the internal command information is issued from the controller 3 to control the flash memory chips 2-0 to 2-3; the external command information is issued from the host computer 5 to control the flash memory system 1.

The ECC block 11 is a functional block for generating an error correction code to be added to data to be written to the flash memory chips 2-0 to 2-3 and to correct any error included in data read from the flash memory chips 2-0 to 2-3.

The flash sequencer block 12 is a functional block for controlling data transfer between the flash memory chips 2-0 to 2-3 and the buffer 9. The flash sequencer block 12 has a plurality of registers (not shown). When a certain value necessary for reading data from the flash memory chips 2-0 to 2-3 or to write data into the flash memory chips 2-0 to 2-3 is set in the registers (not shown) under the control of the microprocessor 6, the flash sequencer block 12 performs certain operations necessary to read data or to write data.

Next, the physical structure of each of the flash memory cells included in the flash memory chips 2-0 to 2-3 will be explained.

Figure 2:
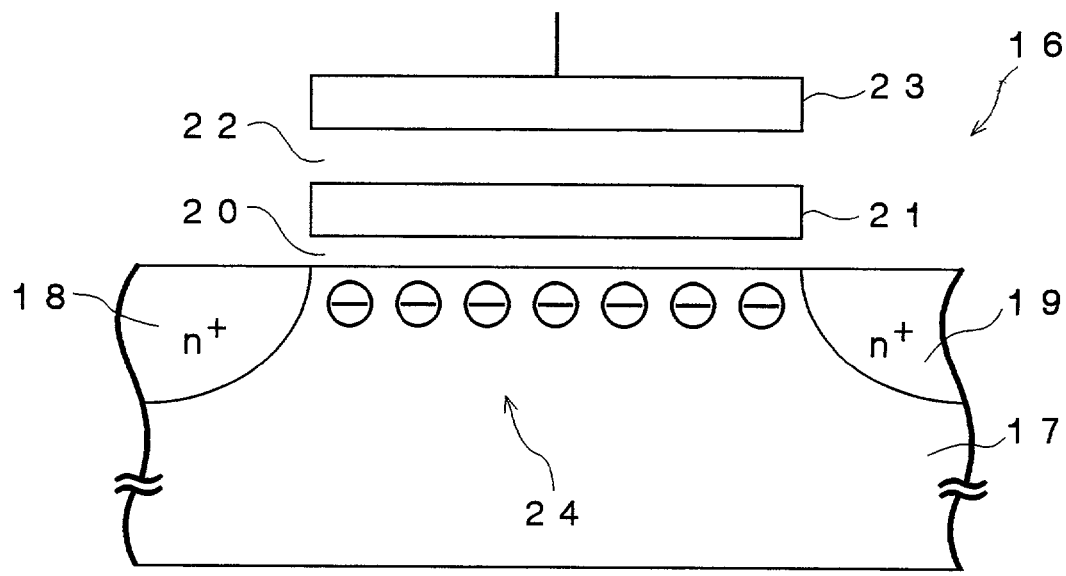
FIG. 2 is a schematic sectional diagram showing a cross-section of a flash memory cell 16 included in flash memory chips 2-0 to 2-3 shown in FIG. 1.

FIG. 2 is a schematic sectional diagram showing a cross-section of a flash memory cell 16 included in the flash memory chips 2-0 to 2-3.

As shown in FIG. 2, the flash memory cell 16 is composed of a semiconductor substrate 17 of p-type, source and drain diffusion regions 18 and 19 of n-type each of which is formed in the semiconductor substrate 17, a tunnel oxide film 20 formed on a part of the semiconductor substrate 17 located between the source and drain diffusion regions 18 and 19, a floating gate electrode 21 formed on the tunnel oxide film 20, an insulating film 22 formed on the floating gate electrode 21, and a control gate electrode 23 formed on the insulating film 22. In the flash memory chips 2-0 to 2-3, pluralities of the flash memory cells 16 having the above-mentioned structure are serially connected to form a flash memory of NAND type.

The flash memory cell 16 exhibits either an "erased state" or a "programmed state" depending on whether electrons are injected into the floating gate electrode 21. The flash memory cell 16 being in the erased state indicates that the data stored therein is "1", and the flash memory cell 16 being in the programmed state indicates that the data stored therein is "0". That is, each flash memory cell 16 can store one bit of digital data.

As shown in FIG. 2, in the erased state, substantially no electrons are injected into the floating gate electrode 21. In the erased state, the flash memory cell 16 becomes a transistor of depletion type so that a channel 24 appears at the surface of the semiconductor substrate 17 of p-type located between the source and drain diffusion regions 18 and 19 regardless of whether reading voltage is being applied to the control gate electrode 23. Therefore, the source and drain diffusion regions 18 and 19 are electrically connected to each other by the channel 24 regardless of whether reading voltage is being applied to the control gate electrode 23.

Figure 3:
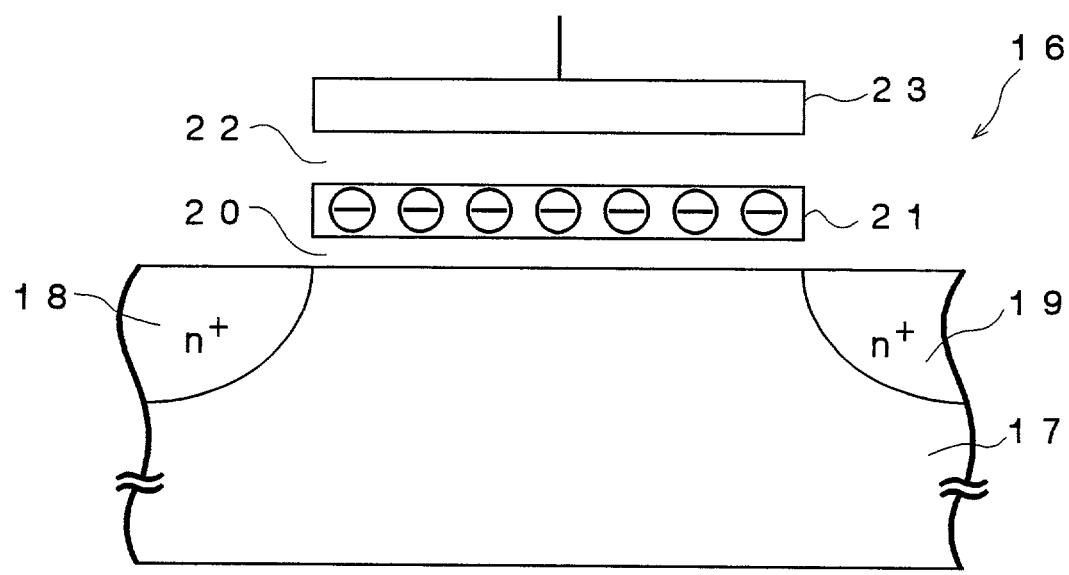
FIG. 3 is a schematic sectional diagram showing a cross-section of the flash memory cell 16 in the programmed state.

FIG. 3 is a schematic sectional diagram showing a cross-section of the flash memory cell 16 in the programmed state.

As shown in FIG. 3, in the programmed state, electrons are injected into the floating gate electrode 21. The electrons injected into the floating gate electrode 21 stay therein for an extremely long period because the floating gate electrode 21 is sandwiched between the tunnel oxide film 20 and the insulating film 22. In the programmed state, the flash memory cell 16 becomes a transistor of enhancement type. Thus, when reading voltage is not applied to the control gate electrode 23, no channel is induced at the surface of the semiconductor substrate 17 of p-type located between the source and drain diffusion regions 18 and 19. On the other hand, when reading voltage is applied to the control gate electrode 23, the channel (not shown) is induced at the surface of the semiconductor substrate 17 of p-type located between the source and drain diffusion regions 18 and 19. Therefore, when reading voltage is not applied to the control gate electrode 23, the source and drain diffusion regions 18 and 19 are electrically isolated from each; when reading voltage is applied to the control gate electrode 23, the source and drain diffusion regions 18 and 19 are electrically connected to each other.

It can be detected whether the flash memory cell 16 is in the erased state or the programmed state by the following steps. First, reading voltage is applied to every control gate electrode 23 of the flash memory cells 16 except for a selected flash memory cell 16, so that the flash memory cells 16 are serially connected to form a serial circuit. Next, it is detected whether or not current can flow through the serial circuit. Then, the state of the selected flash memory cell 16 is judged to be in the erased state if current can flow through the serial circuit, and the state of the selected flash memory cell 16 is judged in the programmed state if current cannot flow through the serial circuit. In this manner, the data stored in each flash memory cell 16 can be detected whether "0" or "1." In the flash memory of NAND type, however, two or more data stored in flash memory cells 16 which belong to the same serial circuit cannot be read out simultaneously.

To change the state of the flash memory cell 16 from the erased state to the programmed state, high positive voltage is applied to the control gate electrode 23 to inject electrons into the floating gate electrode 21 via the tunnel oxide film 20. The injection of the electrons into the floating gate electrode 21 can be performed using an F-N tunnel current. On the other hand, to change the state of the flash memory cell 16 from the programmed state to the erased state, high negative voltage is applied to the control gate electrode 23 to eject the previously injected electrons from the floating gate electrode 21 via the tunnel oxide film 20.

Next, the specific structure of the address space of each of the flash memory chips 2-0 to 2-3 will be explained.

Figure 4:
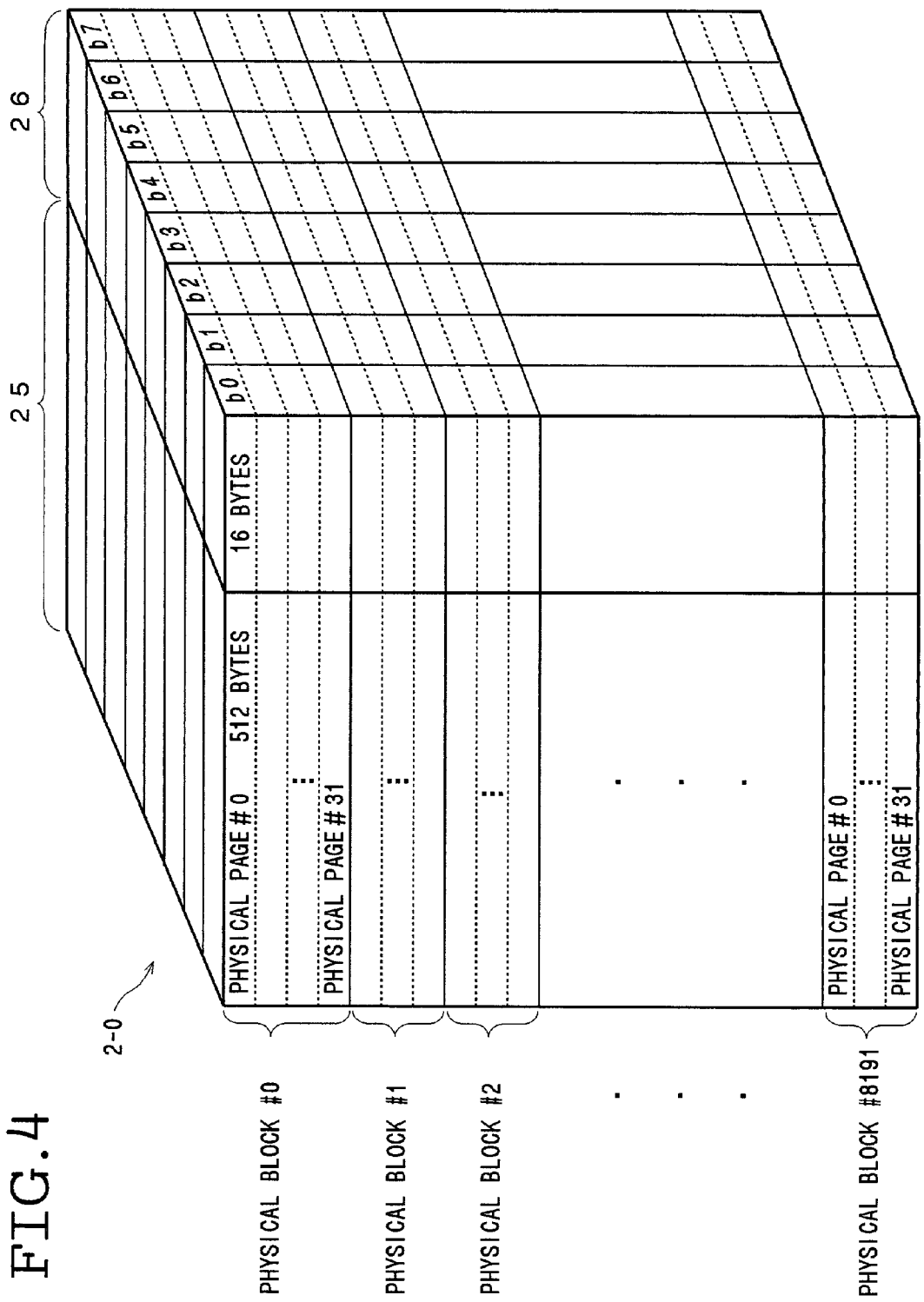
FIG. 4 is a schematic diagram showing the structure of the address space of the flash memory chip 2-0.

FIG. 4 is a schematic diagram showing the structure of the address space of the flash memory chip 2-0.

As shown in FIG. 4, the address space of the flash memory chip 2-0 is divided into 8192 physical blocks composed of physical blocks #0 to #8191. Although not shown in FIG. 4, each of the address spaces of the flash memory chips 2-1 to 2-3 is also divided into 8192 physical blocks composed of blocks #0 to #8191. Each physical block has a memory capacity of 16K bytes.

Each physical block is a unit of block erasing. In other words, in the flash memory chips 2-0 to 2-3, the state of each flash memory cell 16 cannot be changed from the programmed state to the erased state in cell units. To change the state of the flash memory cell 16 from the programmed state to the erased state, it is required to change the states of all flash memory cells 16 of the physical block including the flash memory cells 16 to be erased. In contrast, the state of each flash memory cell 16 can be changed from the erased state to the programmed state in cell units.

Further, as shown in FIG. 4, each physical block #0 to #8191 composing the flash memory chip 2-0 is divided into 32 physical pages composed of physical pages #0 to #31. Similarly to the physical blocks #0 to #8191 composing the flash memory chip 2-0, each physical block #0 to #8191 composing the flash memory chips 2-1 to 2-3 is also divided into 32 physical pages.

Each of the physical pages is an access unit during the data read operation and the data write operation and is composed of a user area 25 of 512 bytes and a redundant area 26 of 16 bytes, where 1 byte is equal to 8 bits composed of bits b0 to b7. The user area 25 is an area for storing user data supplied from the host computer 5.

Figure 5:
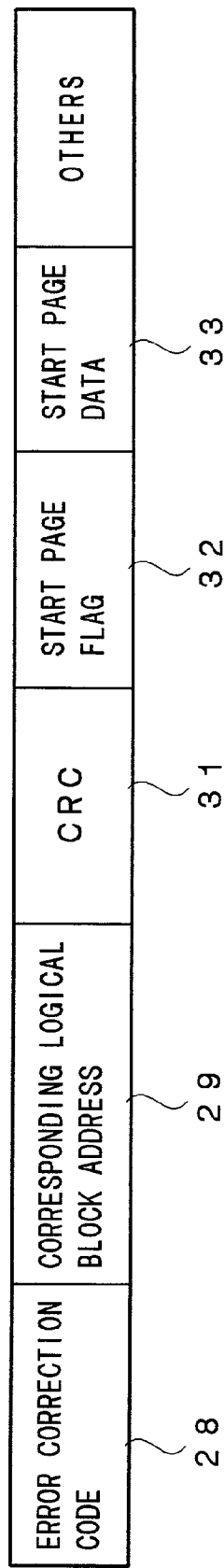
FIG. 5 is a schematic diagram showing the data structure of a redundant area 26.

FIG. 5 is a schematic diagram showing the data structure of the redundant area 26.

As shown in FIG. 5, the redundant area 26 stores an error correction code 28, a corresponding logical block address 29, a cyclic redundancy check bit (CRC) 31 for logical block address, a start page flag 32, a start page data 33 and other additional information.

The error correction code 28 is additional information for correcting errors included in the user data stored in the corresponding user area 25. User data including less than a predetermined number of errors can be completely corrected by using the error correction code.

The corresponding logical block address 29 is additional information, which is valid in the pages #0 to #3 and page #31, for indicating what logical block address can access the corresponding physical block. Details of the corresponding logical block address 29 will be explained later.

The CRC 31 is additional information, which is valid in the page #0 to #3 and page #31, for detecting the errors included in the corresponding logical block address 29. Differently from the error correction code 28, which can correct errors included in the user data, the CRC 31 cannot correct errors included in the corresponding logical block address 29 but can only detect errors.

The start page flag 32 is composed of at least 2 bits; the upper bit is valid in the page #0 and the lower bit is valid in the pages #1 to #30. Specifically, when the start page flag 32 of the page #0 shows "1x (x means either 0 or 1)", there is a start page in this physical block; when the start page flag 32 of the page #0 shows "0x", there is no start page in this physical block. Further, when the start page flag 32 of the pages #0 to #30 show "x0", the corresponding start page data 33 are valid; when the start page flag 32 of the pages #0 to #30 show "x1", the corresponding start page data 33 are invalid.

The start page data 33 represent additional information for identifying the start page of the physical block. In the case where the one or more successive pages including the last page are free pages in which no data are stored, the top page among the successive pages is called "the start page". For example, in the case where data are stored only in the pages #0 to #10 of a certain physical block, the start page of this physical block is the page #11; and in the case where data are stored only in the page #23 of certain physical block, the start page of this physical block is the page #24. Therefore, it is ensured that the start page and every following page of each physical block are free pages.

The start page data 33 can be used to identify the start page by performing "a start page search". In the start page search, the start page data 33 of the page #0 is first referenced and then the start page flag 32 of the page indicated by the start page data 33 of the page #0 is referenced. For example, when the content of the start page data 33 of the page #0 are "00111B (7)", the start page flag 32 of the page #7 is referenced. As a result, when the corresponding start page data 33 are found to be valid from the fact that the referenced start page flag 32 is "x0", the start page flag 32 of the page indicated by the content of the start page data 33 is further referenced. In such a manner, the start page data 33 are sequentially judged whether valid or not based on the corresponding start page flags 32 until the referenced start page flags 32 is found to be "x1". When the referenced start page flag 32 is found to be "x1", the start page search is terminated and this page is found to be "a start page". In the above exemplified case, if the start page flag 32 of the page #7 is "x1", the page #7 is found to be a start page.

The remaining area of the redundant area 26 is an area for storing a block status indicating, for example, a defect of the physical block. However, no explanation will be given here regarding the information stored in the remaining area of the redundant area 26.

As described above, because each page is composed of the user area 25 of 512 bytes and the redundant area 26 of 16 bytes, each page includes 8×(512 bytes+16 bytes)=4224 flash memory cells.

Among the 8192 physical blocks in each flash memory chip 2-0 to 2-3, 8000 physical blocks are used as "actual use blocks" which can store user data and the remaining 192 physical blocks are used as "redundant blocks." The redundant blocks are free blocks which are used in the data write operation. The address space of the flash memory chips 2-0 to 2-3 is formed by only the actual use blocks. If defects arise in one or more physical blocks so that the physical blocks become defective blocks, the number of redundant blocks is decreased by the number of the defective blocks.

Because the flash memory chips 2-0 to 2-3 having the above-mentioned structure are treated as a big single memory having 1 M pages of address space, a host address of 20-bit length is required to access individual pages included in the address space. Among the 20 bits forming the host address, the upper 15 bits are used to select a particular flash memory chip and to select a particular physical block in the selected flash memory chip to be accessed, and the remaining 5 bits (lower 5 bits) are used to select a particular page in the selected physical block to be accessed.

Selection of the flash memory chip and the physical block using the upper 15 bits of the host address is performed by dividing the upper 15 bits of the host address by 8000. The quotient of the division (0-3) designates the flash memory chip to be accessed and the remainder (0 to 7999) designates "the logical block address." The logical block address is converted into a "physical block address" by using an "address translation table" explained later so as to specify the physical block to be actually accessed.

The need for converting the logical block address into the physical block address by referring to the address translation table will be explained.

As mentioned above, although the state of each flash memory cell 16 composing the flash memory chips 2-0 to 2-3 can be changed from the erased state to the programmed state in cell units, the state of the flash memory cells 16 cannot be changed from the programmed state to the erased state in cell units and the state change can be only performed in physical block units. Thus, to store new data into a certain page, it is required that every flash memory cell 16 composing the user area 25 of the page be in the erased state. In other words, if even a single flash memory cell 16 included in the page into which data are stored is in the programmed state, overwriting of other data into such a page cannot be directly performed. Therefore, to overwrite new data into such a page already storing other data, a block erasing operation must be performed in advance to change the states of all of the flash memory cells 16 of the block including the page into which data are to be overwritten to the erased state, whereafter new data are written into the page.

Therefore, in case of overwriting new data into a certain page already storing other data, the data already stored in other pages belonging to the same block must be moved to other pages belonging to another block in order to avoid loss of such data. Hence, the relationship between the logical block address obtained from the host address and the physical block address assigned to each physical block of the flash memory chips 2-0 to 2-3 corresponding to the logical block address is actively changed each time an overwrite operation is requested by the host computer 5. Thus, to access the flash memory chips 2-0 to 2-3 from the host computer 5, an address translation table containing information indicating the relationship between the logical block address and the physical block address corresponding to the logical block address is required. The address translation table will be specifically explained later.

Next, various working data stored in the SRAM work area 8 will be explained. At least an address translation table 37 and an erased block queue 30 are stored in the SRAM work area 8.

Figure 6:
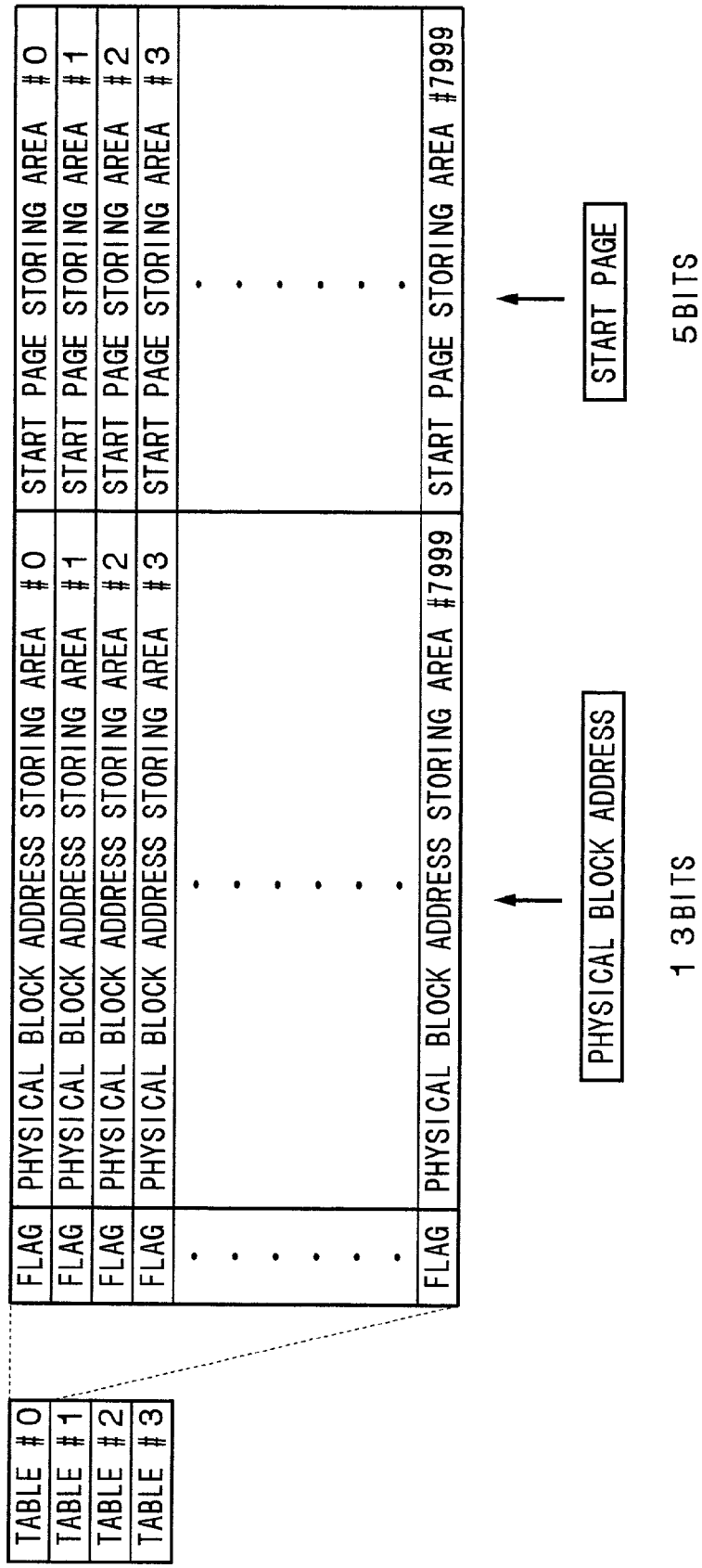
FIG. 6 is a schematic diagram showing the data structure of an address translation table 37 stored in a SRAM work area 8.

FIG. 6 is a schematic diagram showing the data structure of an address translation table 37 stored in the SRAM work area 8.

As shown in FIG. 6, the address translation table 37 is composed of four tables, tables #0 to #3, each of which is composed of 8000 flags, 8000 physical block address storing areas, and 8000 start page storing areas. These tables #0 to #3 correspond to the flash memory chips 2-0 to 2-3, respectively.

Corresponding physical block addresses (13 bits) are stored in the 8000 physical block address storing areas #0 to

7999 of each table #0 to #3 so as to form address translating information indicating the relationships between the logical block addresses and the physical block addresses. Specifically, the physical block addresses of 8000 actual use blocks constituting the flash memory chip 2-0 are stored in the physical block address storing areas #0 to #7999 of the table #0 so as to indicate the relationships between the logical block addresses assigned thereto and the physical block addresses stored therein. Similarly, the physical block addresses of 8000 actual use blocks constituting the flash memory chips 2-1 to 2-3 are stored in the physical block address storing areas #0 to #7999 of the tables #1 to #3.

For example, when the upper 15 bits of the host address supplied from the host computer 5 are 101010101010101B", the physical block address storing area #5845 of the table #2 is selected because the quotient obtained by dividing the upper 15 bits of the host address by 8000 is "2" and the reminder is "5845". Therefore, when the physical block address stored in the physical block address storing area #5845 is "0000000011111B", the physical block address is found to be "31", and thus conversion of the logical block address #5845 for the flash memory chip 22 into the physical block address #31 for the flash memory chip 2-2 is completed.

The 8000 flags of each of tables #0 to #3 correspond to the physical block address storing areas #0 to #7999 of the same table, and each flag indicates whether the physical block address stored in the corresponding physical block address storing area is valid or invalid. Specifically, when the flag indicates "1", the physical block address stored in the corresponding physical block address storing area is valid; and when the flag indicates "0", the physical block address stored in the corresponding physical block address storing area is invalid. Therefore, a logical block address whose flag indicates "0" has not been associated with any physical block addresses yet.

Further, the 8000 start page storing areas #0 to #7999 of each table #0 to #3 correspond to the physical block address storing areas #0 to #7999 of the same table, and each stores information concerning the start page of the physical block specified by the physical block address stored in the corresponding physical block address storing area.

Each of the 8000 start page storing areas #0 to #7999 of each of the tables #0 to #3 stores information concerning the start page using 5 bits. Specifically, when the value stored in a certain start page storing area is "00000B", there is no start page in the corresponding physical block; when the value stored in a certain start page storing area is "00001B", there is a start page in the corresponding physical block but the value of the start page needs to be obtained by conducting the start page search explained earlier; and when the value stored in a certain start page storing area is some other value, the value is that of a start page in the corresponding physical block. For example, when the start page stored in a certain start page storing area is "01100B", the start page of the corresponding physical block is found to be the page #12.

As described above, the address translation table 37 is constituted of 32000 flags each storing 1 bit of data, 32000 physical block address storing areas each storing 13 bits of data, and 32000 start page storing areas each storing 5 bits data. The address translation table 37 therefore occupies an area of 76K bytes in the SRAM work areas 8.

The address translation table 37 is generated as follows:

In the top page (page #0) of each physical block constituting the flash memory chips 2-0 to 2-3 in which user data are stored, the corresponding logical block address 29 indicating to which logical block address the physical block corresponds is stored in the redundant area 26. The logical block address 29 and the CRC 31 stored in the top page (page #0) of each physical block are read under the control of the microprocessor 6 via the flash memory interface block 10.

At this time, it is checked whether each logical block address 29 includes any error by using the CRC 31, and if any error is detected from a certain logical block address 29, the logical block address 29 and the CRC 31 stored in the page #1 of the same physical block are read out. Then, it is also checked whether each logical block address 29 read from the page #1 includes any error by using the CRC 31, and if any error is detected from the logical block address 29 read from the page #1, the logical block address 29 and the CRC 31 stored in the page #2 of the same physical block are further read out. Such operations are performed up to the page #3. If any error is detected from the logical block address 29 read from the page #3, the physical block is checked for presence of a defect. If the physical block is found to be a defective block, the physical block is made unusable thereafter.

On the other hand, when a corresponding logical block address 29 with no error is obtained from any of the pages #0 to #3 of each physical block, it is judged whether these physical blocks are free blocks by using the corresponding logical block addresses 29 under the control of the microprocessor 6.

In an erased free block, the corresponding logical block address 29 stored in the redundant area 26 should be all 1s (1111111111111B). Specifically, the corresponding logical block addresses 29 all fall between #0 (0000000000000B) and #7999 (1111100111111B) and, therefore, a physical block whose corresponding logical block address 29 is all is (1111111111111B) can be determined to be a free block. In other words, when the corresponding logical block address 29 is any one of "0000000000000B" to "1111100111111B", the corresponding logical block address 29 is a valid logical block address.

In the case where the corresponding logical block address 29 which is read from the redundant area 26 of any one of the pages #0 to #3 by the microprocessor 6 is not all 1s (1111111111111B) but a valid logical block address, the physical block address of the physical block from which the corresponding logical block address 29 was read is stored in the physical block address storing area assigned to the same logical block address as the read corresponding logical block address 29 in the table designated by the chip number and the corresponding flag is changed to "1". For example, if the corresponding logical block address 29 read from the physical block belonging to the flash memory chip 2-0 whose physical block address is "10" is "123", "10" is stored as the physical block address in the physical block address storing area #123 and "1" is stored in the corresponding flag #123.

Further, in the case where the corresponding logical block address 29 is a valid logical block address, the start page flag 32 stored in the redundant area 26 of the top page (page #0) of this physical block is referenced by the microprocessor 6. As described above, when the start page flag 32 of the page #0 shows "1x", there is a start page in this physical block, and when the start page flag 32 of the page #0 shows "0x", there is no start page in this physical block. When the referenced start page flag 32 shows "1x", "00001B" is stored in the corresponding start page storing area of the address translation table 37, and when it shows "0x", "00000B" is stored in the corresponding start page storing area of the address translation table 37.

Such operations are performed for every physical block which contains user data. Then, the generation of the address translation table 37 is terminated.

Next, the data structure of the erased block queue 30 stored in the SRAM work area 8 will be explained.

Figure 7:
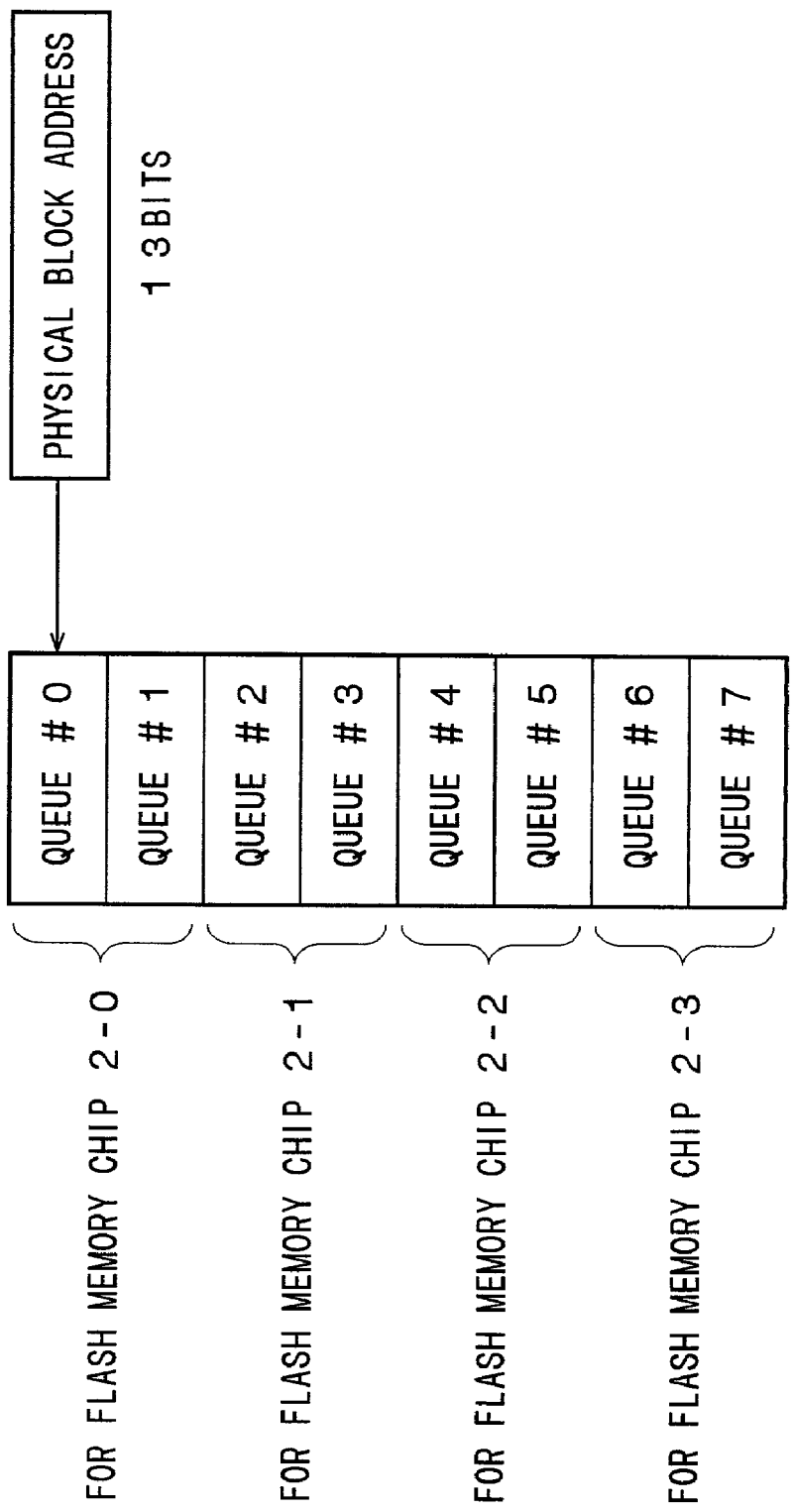
FIG. 7 is a schematic diagram showing the data structure of an erased block queue 30 stored in the SRAM work area 8.

FIG. 7 is a schematic diagram showing the data structure of the erased block queue 30 stored in the SRAM work area 8.

As shown in FIG. 7, the erased block queue 30 is constituted of 8 queues, queues #0 to #7. Each of the queues #0 to #7 occupies 2 bytes of the SRAM work area 8, and a physical block address is stored in each of the queues #0 to #7 by 13 bits of data. Thus, the erased block queue 30 occupies 16 bytes of the SRAM work area 8.

Among the queues #0 to #7 composing the erased block queue 30, the queues #0 and #1 are assigned for the flash memory chip 2-0 to store the physical block addresses of the physical blocks, which belong to the flash memory chip 2-0, in which all flash memory cells 16 composing the user area 25 are in the erased state. Similarly, the queues #2 and #3 are assigned for the flash memory chip 2-1, the queues #4 and #5 are assigned for the flash memory chip 2-2, and the queues #6 and #7 are assigned for the flash memory chip 2-3.

The generation of the erased block queue 30 is performed under the control of the microprocessor 6 during the generation of the address translation table 37.

Specifically, as mentioned above, the corresponding logical block address 29 is included in the redundant area 26 of the pages #0 to #3 of each of the physical blocks composing the flash memory chips 2-0 to 2-3, and the contents of the corresponding logical block addresses 29 are checked to detect erased blocks whose corresponding logical block address 29 is "all 1s (1111111111111B)" under the control of the microprocessor 6 during the generation of the address translation table 37. By this operation, at most 192 erased blocks are detected and become the redundant block per each of the flash memory chips. Further, at most two erased blocks among the redundant blocks are selected per each of the flash memory chips and the physical block addresses thereof are stored in the corresponding queues.

The generation of the erased block queue 30 is performed under the control of the microprocessor 6 during the generation of the address translation table 37.

Next, various data write operations of the flash memory system 1 according to this embodiment will be explained.

Data Write Operation 1 (in Case of Newly Writing Data to a Logical Block Address to which no Data are Assigned)

In case of newly writing data to a logical block address to which no data are assigned, the corresponding logical block address 29 and CRC 31 are stored in the redundant area 26 of each of the pages in which user data are to be stored and also to the pages #0 to #3 and the page #31.

The corresponding logical block address 29 and CRC 31 are stored in the redundant area 26 of each of the pages #0 to #3 so that they can be referenced during the generation of the address translation table 37. Further, the corresponding logical block address 29 and CRC 31 are stored in the redundant area 26 of the page #31 so that the corresponding logical block address in the immediately preceding state of the physical block can be ascertained if the contents of the physical block become incomplete owing to some unexpected cause such as a breakdown of the power source during the interblock data transfer.

The reasons for selecting the pages #0 to #3 as the pages storing the corresponding logical block address 29 and CRC 31 regardless of the page in which user data are to be stored are as follows. Decreasing the number of pages in which the corresponding logical block address 29 and CRC 31 are stored regardless of the page in which user data are to be stored, enables a series of data write operations to be performed at high speed because the number of data write operations for the page is reduced regardless of the page in which user data are to be stored, but, on the other hand, if the corresponding logical block address 29 includes an error, the probability of saving the physical block decreases. On the contrary, increasing the number of pages in which the corresponding logical block address 29 and CRC 31 are stored regardless of the page in which user data are to be stored increases the probability of saving the physical block even if the corresponding logical block address 29 includes an error, but, on the other hand, much time is required to perform a series of data write operations because the number of data write operations for the page regardless of the page in which user data are to be stored increases. Therefore, the number of the pages including the top page (page #0) in which the corresponding logical block address 29 and CRC 31 are stored regardless of the page in which user data is to be stored should be decided by taking the above tradeoff into consideration. In view of foregoing, according to this embodiment, the pages #0 to #3 are selected as the pages in which the corresponding logical block address 29 and CRC 31 are stored regardless of the page in which user data are to be stored because if all corresponding logical block addresses 29 stored in the pages #0 to #3 include an error, the physical block can be concluded to contain a critical defect.

When user data are stored in any page of the user area 25 other than the pages #0 to #3 and the page #31, the corresponding logical block address 29 and CRC 31 are also stored in the redundant area 26 of that page.

When writing data to a free block, therefore, data write operations are always performed for the page in which user data are to be stored, the pages #0 to #3, and the page #31. On the other hand, data write operations for storing the corresponding logical block address 29 and CRC 31 are not performed for the pages #4 to #30 so as long as they are not pages in which user data are to be stored.

Next, writing of the start page flag 32 and the start page data 33 will be explained for the case of writing data to a free block.

In case of writing data to a free block, the number of the page which becomes the start page as a result of the data write operation is stored in the redundant area 26 of the page #0 as the start page data 33 and the start page flag 32 in the redundant area 26 of the page #0 is rewritten to "10". However, in the case where no start page exists as a result of the data write operation, in other words, when the pages in which user data are to be stored include the page #31, the start page flag 32 in the redundant area 26 of the page #0 is rewritten to "0x".

The page which becomes the start page is the page following the last of the target pages in which user data are to be stored.

The data write operations for a free block described above will be more specifically explained using an example.

Here, assume that an external write command (one kind of external command), two host addresses "00000011111010000001B" (host address #0) and "00000011111010000010B" (host address #1), and user data to be written based on each of these host addresses are supplied from the host computer 5 to the flash memory system 1 via the bus 14, the connector 4, and the bus 13.

First, when the host addresses #0 and #1 and the external write command are supplied to the controller 3, these host addresses and the external write command are temporarily stored in a task file register (not shown) of the host interface block 7. Further, when the user data to be written are supplied to the controller 3, they are transferred to the ECC block 11 under the control of the microprocessor 6. In response to receipt of the user data, the ECC block 11 analyzes the user data to generate the error correction codes 28 and the ECC block 11 temporarily stores them. Further, the ECC block 11 generates the start page data by adding 1 to the lower 5 bits of the host address #1 and the ECC block 11 temporarily stores the new start page data. In this case, the new start page data becomes "00011B (3)".

Next, the host addresses #0 and #1 stored in the task file register (not shown) are checked for whether they are invalid, for example, are nonexistent addresses, invalid addresses, or the like, by the host interface block 7.

On one hand, when the check finds the host addresses #0 and #1 stored in the task file register (not shown) to be valid, the host addresses #0 and #1 are converted into the internal addresses by using the address translation table 37. On the other hand, when the host addresses #0 and #1 are found to be invalid, the error register (not shown) of the host interface block 7 is set, so that the host computer 5 can ascertain occurrence of any error by referring to the error register.

The address conversion method is as follows:

First, the upper 15 bits are extracted from the host address of 20 bits and divided by "8000" under the control of the microprocessor 6. The flash memory chip to be accessed is determined from the quotient (0 to 3) and the physical block address is determined from the remainder (0 to 7999). In the exemplified case, because the upper 15 bits of the host address are "000000111110100B", the quotient is "00000B (0)" and the remainder is "0111110100B (500)". This means that the flash memory chip to be accessed is the flash memory chip 2-0 and the logical block address is logical block address #500.

Next, the content of the flag corresponding to the physical block address storing area #500 of the table #0 in the address translation table 37 is read out based on the value of the logical block address #500 under the control of the microprocessor 6. In the exemplified case, because the flag should be "0", it is detected that the physical blocks corresponding to the host addresses #0 and #1 do not exist.

In response to the above, the queue #0 (or queue #1) which is the queue for the flash memory chip 2-0 is selected from among the queues #0 to #7 constituting the erased block queue 30 and the physical block address stored therein is read out under the control of the microprocessor 6. Here, assume that the physical block address stored in the queue #0 is "0000000000100B (4)". As mentioned above, the physical block address stored in the queue #0 of the erased block queue 30 is the physical block address (13 bits) of a free block in the flash memory chip 2-0. In other words, it is the physical block address of a physical block wherein all flash memory cells 16 composing the user area 25 and the redundant area 26 are in the erased state.

When the physical block address "0000000000100B (4)" stored in the queue #0 is read out, it is stored in the physical block address storing area #500 in the table #0 and the start page "00011 (3)" is stored in the start page storing area #500 which corresponds to the physical block address storing area #500. Further, the corresponding flag is changed to "1". Next, the selected chip number, the physical block address, and the lower 5 bits of the host addresses #0 and #1 are combined in this order under the control of the microprocessor 6. The combined addresses are the internal addresses. In the exemplified case, the selected chip number is "00B", the value read from the queue is "0000000000100B", and the lower 5 bits of the host addresses #0 and #1 are "00001B" and "00010B", respectively, so that the values of the internal addresses #0 and #1 become "00000000000010000001B" and "00000000000010000010B", respectively.

This completes the conversion from the host addresses #0 and #1 to the internal addresses #0 and #1. As explained earlier, the upper 2 bits of the internal address specifies the flash memory chip to be accessed, the 13 bits composed of the upper 3rd bit to the upper 15th bit of the internal address specifies the physical block to be accessed, and the lower 5 bits of the internal address specifies the page in the physical block to be accessed. Therefore, the page designated by the internal address #0 is the page #1 of the physical block #4 belonging to the flash memory chip 2-0; and the page designated by the internal address #1 is the page #2 of the physical block #4 belonging to the flash memory chip 2-0.

In response to the completion of internal addresses generation, the registers (not shown) in the flash sequencer block 12 are set under the control of the microprocessor 6. This operation is performed as follows:

First, the internal write command (a kind of internal command) is set in the predetermined registers included in the flash sequencer block 12 under the control of the microprocessor 6. Further, the internal addresses #0 and #1 are set in other registers included in the flash sequencer block 12 under the control of the microprocessor 6.

When the setting of the registers in the flash sequencer block 12 is completed, the sequential data write operations by the flash sequencer block 12 are started. In the exemplified case, the sequential data write operations are performed in the following order: writing the various redundant data to the page #0 of the physical block #4 in the flash memory chip 2-0, writing the user data and the various redundant data to the page #1 of the same physical block, writing the user data and the various redundant data to the page #2 of the same physical block, writing the various redundant data to the page #3 of the same physical block, and writing the various redundant data to the page #31 of the same physical block.

The data write operation for the page #0 of the physical block #4 will be explained first.

In this data write operation, the flash sequencer block 12 directs the flash memory interface block 10 to activate the one of the chip selection signals corresponding to the flash memory chip including the page to be accessed among the flash memory chips 2-0 to 2-3 based on the upper 2 bits of the internal address #0. In the exemplified case, because the upper 2 bits of the internal address #0 are "00B (0)", the flash memory chip including the page to be accessed is the flash memory chip 2-0 so that the chip selection signal #0 is activated. Therefore, data writing for the flash memory chip 2-0 is enabled. The other chip selection signals #1 to #3 are kept in the inactive state.

Next, the flash sequencer block 12 generates a writing address by changing the lower 5 bits of the internal address #0 to "00000B" and directs the flash memory interface block 10 to send the lower 18 bits of the writing address, "000000000010000000B", and the internal write command stored in the prescribed registers to the bus 15. Although the lower 18 bits of the internal address and the internal write command are provided in common for the flash memory chips 2-0 to 2-3 via the bus 15, they are only valid for the flash memory chip 2-0 because the chip selection signal #0 is in the active state while the other the chip selection signals #1 to #3 are in the inactive state.

As a result, the flash memory chip 2-0 is made accessible for writing data into the page #0 of the physical block #4.

Next, the data to be written to the page #0 of the physical block #4 is supplied to the bus 15 via the flash memory interface block 10 under the control of the flash sequencer block 12. The data to be written to the page #0 of the physical block #4 is composed of the corresponding logical block address 29, CRC 31, start page flag 32, start page data 33, and other additional information to be stored in the redundant area 26. In the exemplified case, the corresponding logical block address 29 is "0000111110100B (500)", the CRC 31 is the code corresponding to "0000111110100B (500)", the start page flag 32 is "10", and the start page data 33 are "00011B (3)". No data are stored in the remaining portion of the page #0, i.e. the whole of the user area 25 and the portion for storing the error correction code 28 and the remaining portion of the redundant area 26. However, because data writing is performed to each page as a unit, no data writing is performed for the above areas in which no data are to be stored, but the data "all 1s" is stored in the areas.

Although the corresponding logical block address 29, CRC 31, start page flag 32, start page data 33, and other additional information to be stored in the redundant area 26 are also supplied in common to the flash memory chips 2-0 to 2-3 via bus 15, they are only valid for the flash memory chip 2-0 because only the chip selection signal #0 is in the active state.

After the corresponding logical block address 29, CRC 31, start page flag 32, start page data 33, and other additional information to be stored in the redundant area 26 are transferred to the flash memory chip 2-0, which is made accessible for writing data, the corresponding logical block address 29, CRC 31, start page flag 32, start page data 33, and other additional information to be stored in the redundant area 26 are temporarily stored in an internal register (not shown) in the flash memory chip 2-0.

Next, the flash sequencer block 12 issues the internal write command stored in the prescribed register to the flash memory chip 2-0. In response to the write order, the flash memory chip 2-0 stores the corresponding logical block address 29, CRC 31, start page flag 32, start page data 33, and other additional information to be stored in the redundant area 26 temporarily stored in the register to the prescribed portion of the page #0 of the physical block #4 (flash programming).

This completes the data write operation for the page #0 of the physical block #4.

When the data write operation for the page #0 of the physical block #4 is completed, the data write operation for the page #1 of the physical block #4 is performed.

In the data write operation for the page #1 of the physical block #4, the chip selection signal #0 is activated similarly to what was described above. Then, the flash sequencer block 12 directs the flash memory interface block 10 to send the lower 18 bits of the internal address #0, "000000000010000001B", and the internal write command stored in the prescribed registers to the bus 15. As explained above, the internal address and the internal write command supplied to the bus 15 are valid only for the flash memory chip 2-0 because the chip selection signal #0 is in the active state.

As a result, the flash memory chip 2-0 is made accessible for writing data into the page #1 of the physical block #4.

Next, the data to be written to the page #1 of the physical block #4 is supplied to the bus 15 via the flash memory interface block 10 under the control of the flash sequencer block 12. The data to be written to the page #1 of the physical block #4 is composed of the user data corresponding to the host address #0, error correction code 28 corresponding to the user data, corresponding logical block address 29, CRC 31, start page flag 32, start page data 33, and other additional information to be stored in the redundant area 26. Among them, the corresponding logical block address 29, CRC 31, start page flag 32, and start page data 33 have the same values as those of the data for the page #0.

These data are temporarily stored in the internal register employed in the flash memory chip 2-0, similarly to the above, and are then stored in the prescribed portion of the page #1 of the physical block #4 in response to the issuance the internal write command. Specifically, the user data corresponding to the host address #0 are stored in the user area 25 of the page #1, and the error correction code 28, corresponding logical block address 29, CRC 31, start page flag 32, start page data 33, and the other additional information are stored in the redundant area 26 of the page #1.

This completes the data write operation for the page #1 of the physical block #4.

When the data write operation for the page #1 of the physical block #4 is completed, the data write operation for the page #2 of the physical block #4 is performed.

The data write operation for the page #2 of the physical block #4 is performed using the internal address #1 and uses the same procedure as that of the data write operation for the page #1 of the physical block #4. Therefore, the user data corresponding to the host address #1 are stored in the user area 25 of the page #2, and the error correction code 28, corresponding logical block address 29, CRC 31, start page flag 32, start page data 33, and the other additional information are stored in the redundant area 26 of the page #2.

This completes the data write operation for the page #2 of the physical block #4.

When the data write operation for the page #2 of the physical block #4 is completed, the data write operation for the page #3 of the physical block #4 is performed.

The data write operation for the page #3 of the physical block #4 is the same as the data write operation for the page #0 of the physical block #4 explained earlier except that the start page flag 32 and start page data 33 are not stored. Therefore, the corresponding logical block address 29 and CRC 31 are stored in the redundant area 26 of the page #3.

This completes the data write operation for the page #3 of the physical block #4.

When the data write operation for the page #3 of the physical block #4 is completed, the data write operation for the page #31 of the physical block #4 is performed.

The data write operation for the page #31 of the physical block #4 is the same as the data write operation for the page #3 of the physical block #4. Therefore, the corresponding logical block address 29 and CRC 31 are stored in the redundant area 26 of the page #31.

This completes the series of data write operations.

FIG. 8 is a schematic diagram showing the state of the physical block #4 after the series of data write operations is completed.

In FIG. 8, the portions of the user area 25 in which user data are stored are hatched. Of the data stored in the redundant area 26, only the corresponding logical block address 29, start page flag 32, and start page data 33 are shown and the error correction code 28, CRC 31, and the other additional information are omitted from the drawing. Further, in FIG. 8, the corresponding logical block addresses 29 and start page data 33 are indicated by decimal numerals and the start page flags 32 are indicated by binary numerals.

As shown in FIG. 8, in the physical block #4, user data are stored only in the pages #1 and #2 and no user data are stored in the other pages. The start page of this physical block is therefore "3" and this value is stored in the page #0 as the start page data 33. For this reason, the controller 3 can ascertain that the pages #3 to #31 of this physical block are free pages. When the computer 5 requests a data write operation for any of pages #3 to #31 of the physical block #4, therefore, user data can be directly stored in the pages #3 to #31 without performing an inter-block data transfer.

Although in the above exemplified case the start page flag 32 and the start page data 33 are stored in pages other than the top page #0 (in the pages #1 and #2 in which user data are stored), they are not required to be stored in these pages.

Data Write Operation 2 (in Case of Writing Data to a Logical Block Address that are Different from Data Already Assigned to the Logical Block Address)

In case of writing data to a logical block address that are different from data already assigned to the logical block address, the corresponding start page storing area in the address translation table 37 is first referenced to determine whether progressive data writing to the corresponding physical block is possible.

In this determination, the start page of the corresponding physical block is first identified. The start page can be identified either by conducting a start page search or by directly identifying it from the value stored in the start page storing area in the address translation table 37.

Identification by conducting a page search is used when the physical block has a start page but no data write operation has yet been performed for this physical block following activation of the controller 3. Specifically, "00001B" is written to the corresponding start page storing area in the address translation table 37 when the corresponding logical block address 29 stored in the page #0 (or page #1 to #3) of the physical block is a valid value and the start page flag stored in the page #0 is "1x" and, therefore, the controller 3 can identify the start page of this physical block by a start page search.

On the other hand, the start page is identified from the value stored in the start page storing area in the address translation table 37 when at least one data write operation has been performed for this physical block following activation of the controller 3 as described in Data Write Operation 1. Specifically, in the case where at least one data write operation has been performed for this physical block, because the start page is stored in the corresponding start page storing area of the address translation table 37 as explained earlier, the controller 3 can identify the start page of this physical block by referencing the corresponding start page storing area.

After the start page has been identified in one of these ways, it is finally determined whether progressive data writing is possible by comparing the start page with the top of the target pages of the data writing. In this determination, if the 5 bits indicating the target page of the data writing are equal to or greater than the 5 bits indicating the start page, it is judged that progressive data writing is possible; if the 5 bits indicating the target page of the data writing are less than the 5 bits indicating the start page, it is judged that progressive data writing is impossible.

When the result of the determination is that progressive data writing is possible, progressive data writing is performed as explained later. In progressive data writing, different operations are performed depending on whether the top of the target pages of the data writing is coincident with the start page.

In the case where the top of the target pages of the data writing is coincident with the start page, in other words, the data write operation to store user data is performed for the start page, the page number of the new start page as a result of the data write operation is stored as the start page data 33 in the redundant area 26 of each page in which user data are to be stored.

In the case where the top of the target pages of the data writing is not coincident with the start page, in other words, the data write operation to store user data is not performed for the start page, the page number of the new start page as a result of the data write operation is stored as the start page data 33 in the redundant area 26 of the current start page and each page in which user data are to be stored.

In either cases, when the start page disappears as a result of the data write operation, i.e., when the target pages of the data writing include the page #31, the start page flag 32 stored in the redundant area 26 of the page #0 is changed to "0x".

The page which becomes the new start page is the page following the last of the target pages in which user data are to be stored.

The operations of progressive data writing mentioned above will be more specifically explained using examples.

First, the operation in the case where the top of the target pages in which user data are to be stored is coincident with the start page will be explained.

In the Case where the Top of the Target Pages in which User Data are to be Stored is Coincident with the Start Page Here, assume that the external write command (a kind of external command), the two host addresses "00000011111010000011B" (host address #0) and "00000011111010000100B" (host address #1), and user data to be written based on these host addresses are supplied from the host computer 5 to the flash memory system 1 via the bus 14, the connector 4, and the bus 13 when the above-mentioned Data Write Operation 1 is completed.

Because the basic operations of the controller 3 in response to receiving the host addresses #0 and #1 and the external write command are the same as the operations already explained, repetitive explanation will be omitted.

The address conversion method is as follows:

First, the upper 15 bits are extracted from the host address of 20 bits and are divided by "8000" under the control of the microprocessor 6. The flash memory chip to be accessed is determined from the quotient (0 to 3) and the physical block address is determined from the remainder (0 to 7999).

In the exemplified case, because the upper 15 bits of the host address are "000000111110100B", the quotient is "00000B (0)" and the remainder is "0111110100B (500)". This means that the flash memory chip to be accessed is the flash memory chip 2-0 and the logical block address is logical block address #500.

Next, the content of the flag corresponding to the physical block address storing area #500 of the table #0 in the address translation table 37 is read out based on the value of the logical block address #500 under the control of the microprocessor 6. In the exemplified case, because the flag should be "1", it is detected that there are physical blocks corresponding to the host addresses #0 and #1. In response to this, the content stored in the physical block address storing area #500 is read out. In the exemplified case, because the content of the physical block address storing area #500 is "0000000000100B", it is detected that the physical block corresponding to the host addresses #0 and #1 is the physical block #4 in the flash memory chip 2-0.

Next, the start page storing area #500 is selected based on the physical block address #500 from the table #0 of the address translation table 37 and the content stored therein is read out under the control of the microprocessor 6. In the exemplified case, the content of the start page storing area #500 is "00011B (3)".

The read-out start page is then compared with the top of the target pages under the control of the microprocessor 6. In this case, because the top of the target pages is indicated by the host address #0, the value of the start page, "00011B (3)", and the lower 5 bits of the host address #0, "00011B (3)", are compared. In the exemplified case, because the lower 5 bits of the host address #0, "00011B (3)", are coincident with the value of the start page, "00011B (3)", it is judged that progressive data writing is possible.

Further, a new start page is generated by adding 1 to the lower 5 bits of the host address #1 designating the last of the target pages in which user data are to be stored under the control of the microprocessor 6. The value of the start page is temporarily stored in the ECC block 11 as the start page data. In this case, because the lower 5 bits of the host address #1 are "00100 (4)", the start page data to be stored in the ECC block 11 becomes "00101 (5)".

Then, the selected chip number, the physical block address, and the lower 5 bits of the host addresses #0 and #1 are combined in this order under the control of the microprocessor 6. The combined addresses are internal addresses. In the exemplified case, because the selected chip number is "00B", the content read from the queue is "0000000000100B", and the lower 5 bits of the host addresses #0 and #1 are "00011B" and "00101B", respectively, the values of the internal addresses #0 and #1 become "000000000000010000011B" and "000000000000010000100B", respectively.

Further, the start page "00101 (5)" is overwritten to the start page storing area #500 corresponding to the physical block address storing area #500.

This completes the conversion from the host addresses #0 and #1 to the internal addresses #0 and #1. Thus, the page accessed based on the internal address #0 is the page #3 of the physical block #4 belonging to the flash memory chip 2-0; and the page accessed based on the internal address #1 is the page #4 of the physical block #4 belonging to the flash memory chip 2-0.

After the setting of the registers in the flash sequencer block 12 is completed, the sequential data write operations by the flash sequencer block 12 are started. In the exemplified case, the sequential data write operations are performed in the following order: writing the user data and the various redundant data to the page #3 of the physical block #4 in the flash memory chip 2-0, and writing the user data and the various redundant data to the page #4 of the same physical block.

The data write operation for the page #3 of the physical block #4 will be explained first.

Note that although the corresponding logical block address 29 is already stored in the page #3 of the physical block #4 as a result of the Data Write Operation 1, user data can be stored because all flash memory cells 16 constituting the user area 25 are kept in the erased state (logical value=1).

In the data write operation for the page #3 of the physical block #4, the flash sequencer block 12 activates the chip selection signal #0 based on the upper 2 bits of the internal address #0 stored in the prescribed register. Therefore, data writing for the flash memory chip 2-0 is enabled. The other chip selection signals #1 to #3 are kept in the inactive state.

Next, the flash sequencer block 12 directs the flash memory interface block 10 to send the lower 18 bits of the internal address #0, "000000000010000011B", and the internal write command stored in the prescribed registers to the bus 15. The internal address and the internal write command are only valid for the flash memory chip 2-0 because the chip selection signal #0 is in the active state.

As a result, the flash memory chip 2-0 is made accessible for writing data into the page #3 of the physical block #4.

Next, the data to be written to the page #3 of the physical block #4 is supplied to the bus 15 via the flash memory interface block 10 under the control of the flash sequencer block 12. The data to be written to the page #3 of the physical block #4 is composed of user data corresponding to the host address #0, error correction code 28 corresponding to the user data, start page flag 32, start page data 33, and other additional information to be stored in the redundant area 26.

These data are temporarily stored in the internal register (not shown) in the flash memory chip 2-0 similarly to what was described above, and are then stored in the prescribed portion of the page #3 of the physical block #4 in response to the issuance the internal write command. Specifically, the user data corresponding to the host address #0 are stored in the user area 25 of the page #3, and the error correction code 28, start page flag 32, start page data 33, and the other additional information are stored in the redundant area 26 of the page #3.

This completes the data write operation for the page #3 of the physical block #4.

When the data write operation for the page #3 of the physical block #4 is completed, the data write operation for the page #4 of the physical block #4 is performed.

The data write operation for the page #4 of the physical block #4 is performed using the internal address #1 and uses the same procedure as that of the data write operation for the page #3 of the physical block #4. Therefore, the user data corresponding to the host address #1 are stored in the user area 25 of the page #4, and the error correction code 28, start page flag 32, start page data 33, and the other additional information are stored in the redundant area 26 of the page #4.

This completes the series of data write operations.

FIG. 9 is a schematic diagram showing the physical block #4 after the series of data write operations is completed.

In FIG. 9, the portions of the user area 25 in which user data are stored are hatched. Of the data stored in the redundant area 26, only the corresponding logical block address 29, start page flag 32, and start page data 33 are shown and the error correction code 28, CRC 31, and the other additional information are omitted from the drawing. Further, in FIG. 9, the corresponding logical block address 29 and start page data 33 are indicated by decimal numerals and the start page flags 32 are indicated by binary numerals.

As shown in FIG. 9, in the physical block #4, user data are stored only in the pages #1 to #4 and no user data are stored in the other pages. The start page of this physical block is therefore "5" and this value is stored in the page #3 as the start page data 33. For this reason, the controller 3 can ascertain that the pages #5 to #31 of this physical block are free pages. When the computer 5 requests a data write operation for any of pages #5 to #31 of the physical block #4, therefore, user data can be directly stored in the pages #5 to #31 without performing an inter-block data transfer.

Although in the above exemplified case the start page data 33 is stored in not only the page preceding the prior start page (page #3) but also another page (page #4), they are not required to be stored in this page.

Further, in the above exemplified case, although neither the corresponding logical block address 29 nor the CRC 31 is stored in the pages #3 and #4, which are the target pages, it is permissible to store them in the page #4. However, these data stored in the page #4 are never used.

Moreover, in the above exemplified case, although the start page is directly obtained from the start page storing area #500, in the case where the contents of the SRAM work area 8 were lost owing to the controller 3 being reset after the Data Write Operation 1 was performed, the start page cannot be directly obtained from the start page storing area #500. In this case, because the content of the start page storing area #500 becomes "00001B" by the operation for generating the address translation table 37, which is performed when the controller 3 is reset, the start page must be obtained by means of a start page search.

Next, the operation in the case where the top of the target pages in which user data are to be stored is not coincident with the start page will be explained.

In the Case where the Top of the Target Pages in which User Data are to be Stored is not Coincident with the Start Page Here, assume that the external write command (a kind of external command), the host address "00000011111010000101B" (host address #0) and user data to be written based on the host address are supplied to the flash memory system 1 via the bus 14, the connector 4, and the bus 13 from the host computer 5 when the above-mentioned Data Write Operation 1 is completed.

Because the basic operations of the controller 3 responsive to receiving the host address #0 and the external write command are the same as the operations already explained, repetitive explanation will be omitted.

In the exemplified case, the value of the start page, "00011B (3)", stored in the start page storing area #500 and the top of the target pages in which user data are to be stored are compared. In this case, because the top of the target pages is indicated by the host address #0, the value of the start page, "00011 (3)", and the lower 5 bits of the host address #0, "00101B (5)", are compared. Because the lower 5 bits of the host address #0, "00101B (5)", are greater than the value of the start page, "00011B (3)", it is judged that progressive data writing is possible.

Further, a new start page is generated by adding 1 to the lower 5 bits of the host address #0 designating the last of the target pages in which user data are to be stored under the control of the microprocessor 6. The value of the start page is temporarily stored in the ECC block 11 as the start page data. In this case, because the lower 5 bits of the host address #0 are "00101 (5)", the start page data to be stored in the ECC block 11 becomes "00110 (6)".

The host address is converted to the internal address by the procedure already explained and the obtained internal address #0 is "00000000000010000101B".

Further, the start page "00110 (6)" is overwritten to the start page storing area #500 corresponding to the physical block address storing area #500.

This completes the conversion of the host address #0 to the internal address #0. Thus, the page accessed based on the internal address #0 is the page #5 of the physical block #4 belonging to the flash memory chip 20.

After the setting of the registers (not shown) in the flash sequencer block 12 is completed, the sequential data write operations by the flash sequencer block 12 are started. In the exemplified case, the sequential data write operations are performed in the following order: writing the various redundant data to the page #3 of the physical block #4 in the flash memory chip 2-0, and writing the user data and the various redundant data to the page #5 of the same physical block.

The data write operation for the page #3 of the physical block #4 will be explained first.

Note that although the corresponding logical block address 29 is already stored in the page #3 of the physical block #4 as a result of the Data Write Operation 1, the start page flag 32 and the start page data 33 can be stored because all flash memory cells 16 constituting the area for storing them are kept in the erased state (logical value=1).

In the data write operation for the page #3 of the physical block #4, the flash sequencer block 12 activates the chip selection signal #0 based on the upper 2 bits of the internal address #0 stored in the prescribed register. Therefore, data writing for the flash memory chip 2-0 is enabled. The other chip selection signals #1 to #3 are kept in the inactive state.

Next, the flash sequencer block 12 generates the writing address by changing the lower 5 bits of the internal address #0 to "00011B", heretofore the start page address, and directs the flash memory interface block 10 to send the lower 18 bits of the writing address, "00000000010000011B", and the internal write command stored in the prescribed registers to the bus 15. The internal address and the internal write command are only valid for the flash memory chip 2-0 because the chip selection signal #0 is in the active state.

As a result, the flash memory chip 2-0 is made accessible for writing data into the page #3 of the physical block #4.

Next, the data to be written to the page #3 of the physical block #4 is supplied to the bus 15 via the flash memory interface block 10 under the control of the flash sequencer block 12. The data to be written to the page #3 of the physical block #4 is composed of the start page flag 32 and the start page data 33.

These data are temporarily stored in the internal register (not shown) in the flash memory chip 2-0 similarly to what was described above, and are then stored in the prescribed portion of the page #3 of the physical block #4 in response to the issuance of the internal write command. Specifically, the start page flag 32 and the start page data 33 are stored in the redundant area 26 of the page #3.

This completes the data write operation for the page #3 of the physical block #4.

When the data write operation for the page #3 of the physical block #4 is completed, the data write operation for the page #5 of the physical block #4 is performed.

The data write operation for the page #5 of the physical block #4 is performed using the internal address #0. The procedure of the data write operation is the same as that already explained several times. Therefore, the user data corresponding to the host address #0 are stored in the user area 25 of the page #5, and the error correction code 28, start page data 33, and the other additional information are stored in the redundant area 26 of the page #5.

This completes the series of data write operations.

FIG. 10 is a schematic diagram showing the physical block #4 after the series of data write operations are completed.

In FIG. 10, the portions of the user area 25 in which user data are stored are hatched. Of the data stored in the redundant area 26, only the corresponding logical block address 29, start page flag 32, and start page data 33 are shown and the error correction code 28, CRC 31, and the other additional information are omitted from the drawing. Further, in FIG. 10, the corresponding logical block addresses 29 and start page data 33 are indicated by decimal numerals and the start page flags 32 are indicated by binary numerals.

As shown in FIG. 10, in the physical block #4, user data are stored only in the pages #1, #2 and #5 and no user data are stored in the other pages. The start page of this physical block is "6" and this value is stored in the page #3 as the start page data 33. For this reason, the controller 3 can ascertain that the pages #6 to #31 of this physical block are free pages. When the computer 5 requests a data write operation for any of pages #6 to #31 of the physical block #4, therefore, user data can be directly stored in the pages #6 to #31 without performing an inter-block data transfer.

Although in the above exemplified case the start page data 33 are stored in the target page, page #5, they are not required to be stored in this page.

Further, in the above exemplified case, although neither corresponding logical block address 29 nor the CRC 31 is stored in the page #5, which is the target page, it is permissible to store them in the page #5. However, as mentioned earlier, these data are never used.

Moreover, in the above exemplified case, although the start page is directly obtained from the start page storing area #500, in the case where the contents of the SRAM work area 8 were lost owing to the controller 3 being reset after the Data Write Operation 1 was performed, the start page must be obtained by a start page search.

Data Write Operation 3 (in Case of Writing Data to the Page #31)

In case of writing data to the page #31, "0" is stored in the upper bit of the start page flag 32 of the top page #0 and "00000B" is stored in the corresponding start page storing area of the address translation table 37 regardless of whether the physical block is a free block or a block in which user data are already stored (a used block). By this, it is indicated that progressive data writing for this physical block is impossible.

The data write operations for the last page #31 will be more specifically explained using an example.

Here, assume that the external write command (a kind of external command), the host address "00000011111010011111B" (host address #0) and user data to be written based on the host address are supplied to the flash memory system 1 via the bus 14, the connector 4, and the bus 13 from the host computer 5 when the above-mentioned Data Write Operation 1 is completed.

Because the basic operations of the controller 3 responsive to receiving the host address #0 and the external write command are the same as the operations already explained, repetitive explanation will be omitted.

In the exemplified case, the value of the start page, "00011B (3)", stored in the start page storing area #500 and the top of the target pages in which user data are to be stored are compared. In this case, because the top of the target pages is indicated by the host address #0, the value of the start page, "00011B (3)", and the lower 5 bits of the host address #0, "11111B (31)", are compared. Because the lower 5 bits of the host address #0, "11111B (31)", are greater than the value of the start page, "00011B (3)", it is judged that progressive data writing is possible.

The host address is converted to the internal address by the procedure already explained and the obtained internal address #0 is "00000000000010011111B".

Further, in response to the fact that the lower 5 bits of the host address #0 are "11111B (31)", the value "00000 (0)" is overwritten to the start page storing area #500 corresponding to the physical block address storing area #500.

This completes the conversion of the host address #0 to the internal address #0. Thus, the page accessed based on the internal address #0 is the page #31 of the physical block #4 belonging to the flash memory chip 2-0.

After the setting of the registers (not shown) in the flash sequencer block 12 is completed, the sequential data write operations by the flash sequencer block 12 are started. In the exemplified case, the sequential data write operations are performed in the following order: writing the various redundant data to the page #0 of the physical block #4 in the flash memory chip 2-0, and writing the user data and the various redundant data to the page #31 of the same physical block.

The data write operation for the page #0 of the physical block #4 will be explained first.

Note that although the corresponding logical block address 29 is already stored in the page #0 of the physical block #4 as a result of the Data Write Operation 1, the start page flag 32 can be stored because the flash memory cell 16 corresponding to the upper bit of the start page flag 32 is kept in the erased state (logical value=1).

In the data write operation for the page #0 of the physical block #4, the flash sequencer block 12 activates the chip selection signal #0 based on the upper 2 bits of the internal address #0 stored in the prescribed register. Therefore, data writing for the flash memory chip 2-0 is enabled. The other chip selection signals #1 to #3 are kept in the inactive state.

Next, the flash sequencer block 12 generates the writing address by changing the lower 5 bits of the internal address #0 to "00000B" and directs the flash memory interface block 10 to send the lower 18 bits of the writing address, "000000000010000000B", and the internal write command stored in the prescribed registers to the bus 15. The internal address and the internal write command are only valid for the flash memory chip 2-0 because the chip selection signal #0 is in the active state.

As a result, the flash memory chip 2-0 is made accessible for writing data into the page #0 of the physical block #4.

Next, the data to be written to the page #0 of the physical block #4 are supplied to the bus 15 via the flash memory interface block 10 under the control of the flash sequencer block 12. The data to be written to the page #0 of the physical block #4 are the data of the start page flag 32.

The data are temporarily stored in the internal register (not shown) in the flash memory chip 2-0 similarly to what was described above, and are then stored in the prescribed portion of the page #0 of the physical block #4 in response to the issuance the internal write command. Specifically, the start page flag 32, whose value is "00", is stored in the redundant area 26 of the page #0.

This completes the data write operation for the page #0 of the physical block #4.

When the data write operation for the page #0 of the physical block #4 is completed, then the data write operation for the page #31 of the physical block #4 is performed.

The data write operation for the page #31 of the physical block #4 is performed using the internal address #0. The procedure of the data write operation is the same as that already explained several times. Therefore, the user data corresponding to the host address #0 are stored in the user area 25 of the page #31, and the error correction code 28 and the other additional information are stored in the redundant area 26 of the page #31 This completes the series of data write operations.

FIG. 11 is a schematic diagram showing the physical block #4 after the series of data write operations is completed.

In FIG. 11, the portions of the user area 25 in which user data are stored are hatched. Of the data stored in the redundant area 26, only the corresponding logical block address 29, start page flag 32, and start page data 33 are shown and the error correction code 28, CRC 31, and the other additional information are omitted. Further, in FIG. 11, the corresponding logical block addresses 29 and start page data 33 are indicated by decimal numerals, and the start page flags 32 are indicated by binary numerals.

As shown in FIG. 11, because user data are stored in the last page #31 of the physical block #4, there is no start page in this physical block. To indicate this fact, the value of the start page flag 32 is "00" and the content of the start page storing area #500 corresponding to this physical block is "00000B". For this reason, the controller 3 can ascertain that no start page exists in this physical block. Therefore, when the host computer 5 requests a data write operation for any of the pages of the physical block #4, an inter-block data transfer is performed.

In the above exemplified case, although the start page is directly obtained from the start page storing area #500, in the case where the contents of the SRAM work area 8 were lost owing to the controller 3 being reset after the Data Write Operation 1 was performed, the start page must be obtained by a start page search.

As described above, in the flash memory system 1 of the embodiment, the introduction of the "start page" concept makes it possible to ensure that the start page and all pages following the start page among the pages constituting each physical block are free pages. Therefore, when a data write operation for a physical block which already stores some user data is requested, user data can be directly stored in this physical block without performing an inter-block data transfer insofar as the request is related to the start page or the following pages. Therefore, a series of data write operations for completing data writing can be performed at high speed.

Further, according to the flash memory system 1 of the embodiment, the start page data 33 are stored in the redundant area 26 of each page so as to express the start page by a link utilizing the start page data 33. The data reading for the top pages (page #0) of each physical block is therefore required only during the generation of the address translation table 37. Because such a data reading is usually performed during initialization (resetting) of the controller 3, the time required for initialization is not increased by applying the present invention.

Furthermore, according to the flash memory system 1 of the embodiment, the start page of a physical block for which the data write operation has once been performed is stored in the corresponding start page storing area. The start page of this physical block can therefore be obtained very rapidly when the next data write operation for the same physical block is performed.

Further, according to the flash memory system 1 of the embodiment, in the case of writing data to a free block, the corresponding logical block address 29 and the CRC 31 are stored in the redundant area 26 of each page in which user data are to be stored and the pages #0 to #3 and the page #31 of the same physical block regardless of the page in which user data are to be stored. The logical block address corresponding to this physical block can therefore be reliably specified even if an error arises in the corresponding logical block address 29 stored in the top page (page #0). Moreover, the corresponding logical block address 29 and the CRC 31 are not stored in the redundant area 26 of either the page in which user data are to be stored or the pages #0 to #3 and page #31. As a result, no time is spent on needless writing operations. Therefore, a series of data write operations for completing data writing can be performed at high speed.

The present invention has thus been shown and described with reference to specific embodiments. However, it should be noted that the present invention is in no way limited to the details of the described arrangements but changes and modifications may be made without departing from the scope of the appended claims.

For example, in the flash memory system 1 according to the above described embodiment, the start page data 33 is stored in the redundant area 26 of each page so as to express the start page by a link utilizing the start page data 33. However, the method of expressing the start page is not limited to this method and any of various other methods can be adopted instead. For example, information concerning all of the free pages of each physical block can be stored in the address translation table 37 to enable progressive data writing. In this case, because, differently from in the flash memory system 1 of the foregoing embodiment, information concerning all of the free pages is used, progressive data writing can be performed more effectively to decrease the frequency of inter-block data transfers still further. In this case, however, because much time is needed to store the information concerning all of the free pages in the address translation table 37, the initializing speed of the controller 3 is slower.

Further, in the flash memory system 1 according to the above described embodiment, the start page flag 32 is constituted of 2 bits. However, the start page flag 32 can instead be constituted of 1 bit that is used in page #0 to indicate whether any start page exists in the physical block and is used in pages #1 to #30 to indicate whether the corresponding start page data is valid.

Furthermore, in the flash memory system 1 according to the above described embodiment, when the start page flag 32 referenced during the start page search is "x1", the start page search is terminated and that page is defined as the start page. However, the start page data 33 can be referenced during the start page search and when the start page data 33 are "11111 (31)", that page be defined as the start page. In this case, it is necessary to determine whether the start page data "11111 (31)" indicate that the start page search has been completed or that the start page is the page #31, using the start page flag 32, for example.

Further, in the flash memory system 1 according to the above described embodiment, no restriction is placed on the page to which the start page flag 32 to be referenced during a start page search belongs. However, it is instead possible to conduct error processing on the assumption that the start page data 33 includes an error if the page number of the page whose start page flag 32 is to be referenced is smaller than that of the source page.

Furthermore, in the flash memory system 1 according to the above described embodiment, no restriction is placed on the number of times referencing is conducted during a start page search. However, it is possible to limit the number of referencings (to 30 times, for example) and to conduct error processing on the assumption that the start page data includes an error if the number of referencings exceeds the limit.

Further, in the flash memory system 1 according to the above described embodiment, each physical block is composed of 32 pages. However, the number of pages composing each physical block is not limited to 32 and can be another number such as 16 or 64. The effects of the present invention increase with increasing number of pages composing each physical block.

Furthermore, in the flash memory system 1 according to the above described embodiment, the corresponding logical block address 29 and the CRC 31 are stored in the redundant area 26 of each of the pages #0 to #3 of the physical block regardless of the page in which user data are to be stored. However, the pages in which the corresponding logical block address 29 and the CRC 31 are to be stored regardless of the page in which user data are to be stored are not limited to the pages #0 to #3 and any pages can be selected for this purpose so long as they are a plurality of successive pages including the page #0. For example, the pages #0 to #2 can be selected. In this case, when an error is detected from the corresponding logical block address 29 stored in the last of the pages in which the corresponding logical block address 29 and the CRC 31 are stored (except the page #31), the physical block is treated as a defective block.

Further, in the flash memory system 1 according to the above described embodiment, in the case of writing data to a free block, the corresponding logical block address 29 and the CRC 31 are stored not only in the redundant areas 26 of the pages #0 to #3 and the page #31 but also in those of other pages in which user data are to be stored. However, they are not required to be stored in the redundant areas 26 of these other pages.

Furthermore, in the flash memory system 1 according to the above described embodiment, the address translation table 37 covering all physical blocks in which the data are stored is stored in the SRAM work area 8. However, it is not necessary to store an address translation table covering all such physical blocks and an address translation covering only part of such physical blocks can be stored instead. In this case, the required capacity of the SRAM work area 8 is smaller. However, in the case where only a partial address translation table is stored, the address translation table should be updated each time an access request is made with respect to a physical block whose information is not stored in the address translation table.

Moreover, in the flash memory system 1 according to the above described embodiment, the flash memory system 1 is embodied as a card employing the four flash memory chips 2-0 to 2-3 and the controller 3. However, the flash memory system according to the present invention is not limited to a card-shape and can be embodied in other shapes such as a stick-like shape.

Further, in the flash memory system 1 according to the above described embodiment, the flash memory system 1 is embodied as a card in which the 4 flash memory chips 2-0 to 2-3 and the controller 3 are integrated. However, the present invention is not limited to a flash memory system in which the flash memory chips 2-0 to 2-3 and the controller 3 are integrated in the same package and the flash memory chips and controller can instead be packaged individually. In this case, connectors must be provided in the package for the flash memory chips 2-0 to 2-3 and the package for the controller 3 to establish electrical and physical connection therebetween. With this arrangement, the package for the flash memory chips 2-0 to 2-3 can be removably attached to the package for the controller 3. Moreover, the invention is also not limited to the flash memory chips 2-0 to 2-3 being integrated in the same package but also encompasses the case where they are packed in individual packages.

Further, in the flash memory system 1 according to the above described embodiment, the memory capacity of each of the flash memory chips 2-0 to 2-3 is 128 M bytes (1 G bits). However, the memory capacity of each of the flash memory chips employed in the flash memory system according to the present invention is not limited to 128 M bytes (1 G bits) and can be another capacity such as 32 M bytes (256 M bits).

Furthermore, in the flash memory system 1 according to the above described embodiment, each page constituting the minimum access unit is composed of 512 bytes. However, the capacity of the page constituting the minimum access unit is not limited to 512 bytes but can be another capacity.

Furthermore, in the flash memory system 1 according to the above described embodiment, each flash memory cell 16 employed in the flash memory chips 2-0 to 2-3 can store 1 bit of data. However, the flash memory cells employed in the flash memory chip can be ones enabled to store 2 or more bits of data by controlling the number of electrons injected into the floating gate electrode 21.

Further, in the flash memory system 1 according to the above described embodiment, the erased block queue 30 is composed of the queues in which 2 queues are assigned for each flash memory chip 2-0 to 2-3. However, the number of queues assigned for each flash memory chip 2-0 to 2-3 is not limited to 2 and can be another number such as 1 or 8.

Furthermore, in the flash memory system 1 according to the above described embodiment, flash memory chips 2-0 to 2-3 of NAND type are used. However, the flash memory chip which can be controlled by the method according to the present invention is not limited to the flash memory chip of NAND type and flash memory chips of other types, AND type, for example, can also be controlled.

Further, in this specification and the appended claims, the respective means need not necessarily be physical means and arrangements whereby the functions of the respective means are accomplished by software fall within the scope of the present invention. In addition, the function of a single means may be accomplished by two or more physical means and the functions of two or more means may be accomplished by a single physical means.

The present invention can be embodied as a PC card conforming with the standard proposed by the PCMCIA (Personal Computer Memory Card International Association). Further, the present invention can be embodied as a highly miniaturized memory card realized by the development of high-integration technologies for semiconductor devices, such as the Compact Flash™ proposed by the CFA (Compact Flash Association), the MMC™ (MultiMedia Card) proposed by the MultiMedia Card Association, the Memory Stick™ proposed by SONY corporation, the SD Memory Card™ proposed by Matsushita electric corporation, or the like.

As explained in the foregoing, the present invention provides a memory controller, a flash memory system and a method for controlling the flash memory that can perform a series of data write operations to a flash memory device at high speed.

The invention claimed is:

1. A memory controller for accessing a flash memory having a plurality of physical blocks each including a plurality of pages and in which stored data is erased in a unit of the physical block, based on a host address which is in a unit of a sector, supplied from a host computer, comprising:

search means for searching a start page in the physical block corresponding to the host address supplied from the host computer;

determining means for determining whether a first page of a page or pages corresponding to the host address supplied from the host computer is either one of the searched start page and a page located after the searched start page, or not;

write means for writing data supplied from the host computer into the page or pages corresponding to the host address supplied from the host computer when the determining means determines that the first page of a page or pages corresponding to the host address supplied from the host computer is the searched start page or the page located after the searched start page; and start page information write means which writes start page information into a redundant area of the start page which is searched by the search means, the start page information representing a page which is next to a last page of the page or pages into which data will be written by the write means and become a new start page after the data is written by the writing means; wherein the start page being a page next to the last page of a page or pages into which the data supplied from the host computer is written; and the search means searching the start page by referring to the start page information written in the redundant area.

2. A flash memory system having a flash memory and the memory controller as set forth in claim 1.

3. A memory control method for accessing a flash memory having a plurality of physical blocks each including a plurality of pages and in which stored data is erased in unit of the physical block, based on a host address which is in a unit of a sector, supplied from a host computer, comprising:

searching a start page in a physical block corresponding to the host address supplied from the host computer;

determining whether first page or a page or pages corresponding to the host address supplied from the host computer is either one of the searched start page and a page located after the searched start page, or not;

writing data supplied from the host computer into the page or pages corresponding to the host address supplied from the host computer when determining that the page or pages corresponding to the host address supplied from the host computer is the searched start page or the page located after the searched start page; and writing start page information into a redundant area of the start page when starting writing data supplied from the host computer into the flash memory;

the start page being a page next to a last page or pages into which the data supplied from the host computer is written;

the start page being searched based on the start information by referring to the data written in the redundant area.

* * * * *

UNITED STATES PATENT AND TRADEMARK OFFICE
CERTIFICATE OF CORRECTION

PATENT NO. : 7,617,352 B2
APPLICATION NO. : 10/032949
DATED : November 10, 2009
INVENTOR(S) : Mukaida et al.

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 80 days.

Signed and Sealed this

Nineteenth Day of October, 2010

David J. Kappos
*Director of the United States Patent and Trademark Office*